(12) United States Patent
Lisi et al.

(10) Patent No.: US 8,798,578 B2
(45) Date of Patent: *Aug. 5, 2014

(54) COMPUTER-IMPLEMENTED METHOD, SYSTEM, AND COMPUTER PROGRAM PRODUCT FOR TELECOMMUNICATIONS RATING

(71) Applicant: Accenture Global Services Limited, Dublin (IE)

(72) Inventors: Rocco Lisi, San Nicola la Strada Caserta (IT); Fabio Di Fenza, Rome (IT); Stefano Pompei, Rome (IT)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,869

(22) Filed: Dec. 12, 2013

(65) Prior Publication Data
US 2014/0099918 A1    Apr. 10, 2014

Related U.S. Application Data

(63) Continuation of application No. 13/189,912, filed on Jul. 25, 2011, now Pat. No. 8,630,613.

(30) Foreign Application Priority Data

Jul. 29, 2010 (EP) .................................. 10425261

(51) Int. Cl.
*H04M 11/00* (2006.01)
*H04M 3/42* (2006.01)
*H04L 29/06* (2006.01)

(52) U.S. Cl.
USPC ................... 455/406; 455/414.1; 455/414.2; 455/414.3

(58) Field of Classification Search
CPC ....................................................... H04W 4/26
USPC ............................................................ 455/406
See application file for complete search history.

(56) References Cited

PUBLICATIONS

Communication & European Search Report from priority European Application No. 1 0425261.4-2414 dated Feb. 4, 2011.
Ofrane, Avi; Harte, Lawrence: "Introduction to Telecom Billing, Usage Events, Call Detail Records, and Billing Cycles", 2004, ALTHOS Publishing, XP002618251, ISBN: 978-0-9742787-4-2; pp. 13-15.

*Primary Examiner* — Huy C Ho
(74) *Attorney, Agent, or Firm* — Brinks Gilson & Lione

(57) ABSTRACT

The present application relates to a computer-implemented method, system, and computer program product for telecommunications rating. The computer-implemented method for telecommunications rating may comprise: receiving an event from a source system for a service, wherein the event is generated by a user; transforming the event into a normalized event by determining event characteristics comprising determining a guiding point identifier to identify a guiding point associated with the user; by using the guiding point identifier, retrieving from the guiding point a list of products operable to guide the normalized event; rating the normalized event by calculating and aggregating costs according to the list of products; and posting the costs by updating at least one balance associated with the user, the guiding point, and/or the service.

21 Claims, 17 Drawing Sheets

CUSTOMER: 111

| Field name | Example values | Description |
|---|---|---|
| Customer_ID | 123456 | Identifier for the customer |
| Name | John | Customer's name |
| Surname | Doe | Customer's surname |
| Customer_Status_Code | 1 | The Customer's status (active, cancelled,....) |
| Start_Date | 01/01/2008 | Creation date for the customer |
| End_Date | 30/12/2999 | End date for the customer |
| Customer_Type_ID | 100000 | Customer typology (prepaid, postpaid) |

Figure 1B

Guiding Point:

121

| Field name | Example values | Description |
|---|---|---|
| Guiding_Point_ID | 123456 | Identifier for the guiding point |
| Guiding_Point_Status_Code | 1 | The Guiding Point's status (active, cancelled,....) |
| Start_Date | 01/01/2008 | The Guiding Point starting date |
| End_Date | 30/12/2999 | The Guiding Point ending date |
| Service_Name | 213483212 | The name associated to the Guiding Point |
| Network_Name | +39312300 | The name on the network for the Guiding Point |
| Guiding_Point_Type_ID | 2 | The Guiding Point typology |
| Guiding_Point_A | XXXX | Additional information for the Guiding Point |
| Guiding_Point_B | YYYY | Additional information for the Guiding Point |

Figure 1C

Service:

| Field name | Example values | Description |
|---|---|---|
| Service_ID | 123456 | Identifier for the service |
| Service_Type_ID | 2 | The typology of the service |
| Start_Date | 01/01/2008 | The service starting date |
| End_Date | 30/12/2999 | The service ending date |
| Service_Status_Code | 1 | The service status code |

Balance:

| Field name | Example values | Description |
|---|---|---|
| Balance_ID | 123456 | Identifier for the Balance |
| Balance_Type_ID | 1 | The balance typology |
| Amount | 200 | The balance amount |
| Balance_Limit | 600 | The balance limit |
| Customer_ID | 98765 | The customer who has this balance |
| Guiding_Point_ID | 54321 | The guiding point associated to the balance |

Product:

| Field name | Example values | Description |
|---|---|---|
| Rating_Items_ID | 123456 | Identifier for this rating items |
| Rating_Items_Status_Code | 2 | Status code for the item |
| Start_Date | 01/01/2008 | Item starting date |
| End_Date | 30/12/2999 | Item ending date |
| Customer_ID | 98765 | Customer Identifier associated to the rating item |
| Guiding_Point_ID | 54321 | Guiding Point Identifier associated to the rating item |
| Service_ID | 97531 | Service Identifier associated to the rating item |
| Name | Prod1 | The product name |
| Description | ... | The product description |

Utilization Threshold:

| Field name | Example values | Description |
|---|---|---|
| Utilization_Threshold_ID | 123456 | Identifier for the Utilization Threshold |
| Start_Date | 01/01/2008 | Utilization threshold starting date |
| End_Date | 30/12/2999 | Utilization threshold ending date |
| Customer_Id | 98765 | Customer Identifier associated to the rating item |
| Guiding_Point_ID | 54321 | Guiding Point Identifier associated to the rating item |
| Service_ID | 24680 | Service Identifier associated to the rating item |
| Counter | 2 | Bucket Counter for the threshold |
| UOM | 6 | Unit of measure identifier |
| Utilization_Threshold_Type_ID | 1 | Threshold typology identifier |

| Field name | Description |
|---|---|
| RECORD_TYPE 232-1 | Record typology |
| EVENT_TYPE 232-2 | Event typology |
| CALLING_SERVICE_NAME 232-3 | Service Identifier for the event sender |
| CALLING_NETWORK_NAME 232-4 | Network Identifier for the event sender |
| CALLED_SERVICE_NAME 232-5 | Service identifier for the event receiver |
| CALLED_NETWORK_NAME 232-6 | Network Identifier for the event receiver |
| NETWORK_TYPE 232-7 | Network typology (GSM, UMTS, Satellite) |
| CALLING_OPERATOR_ID 232-8 | Identifier of the Operator of the event sender |
| CALLED_OPERATOR_ID 232-9 | Identifier of the Operator of the event receiver |
| APN_CODE 232-10 | Access point name |
| ACCESS_METHOD 232-11 | Access method to the service |
| NETWORK_ID 232-12 | Identifier of the Network used for the event |
| EVENT_START_DATE 232-13 | Timestamp of the begin of the event |
| TIME_BAND 232-14 | Universal Coordinated Time |
| DURATION 232-15 | Number of seconds of the event |
| VOLUME 232-16 | Number of bytes of the event |
| PULSES 232-17 | Number of units of the event |
| PRICE 232-18 | Cost of the event |
| CURRENCY_ID 232-19 | Identified for the currency of the price |
| SESSION_ID 232-20 | Unique identifier of the event |

Figure 3

| Column Name | Applicability | Description |
| --- | --- | --- |
| WHAT 252-1 | Mandatory | Code that define uniquely the event type |
| FROM 252-2 | Mandatory | Code that define the characteristics of the location from which the event has been consumed |
| TO 252-3 | Mandatory | Code that define the characteristics of the destination location |
| WHEN 252-4 | Mandatory | Code that characterize the timing of the event |
| PRODUCT 252-5 | Mandatory | Product Identifier |
| SEQ_NUM 252-6 | Mandatory | Incremental number that define the order of rule application for same event and same product |
| CHARGING_METHOD 252-7 | Mandatory | Define the logic that has to be used to price the event |
| CHARGE 252-8 | Non-Mandatory | Surcharge or Flat Amount (depending upon the charge method) |
| MIN_AMOUNT 252-9 | Non-Mandatory | The minimum charge (overall or per range) that is to be generated for events using this rate. This column should contain either a single value or the same number of entries as for the RATES column. |
| MAX_AMOUNT 252-10 | Non-Mandatory | The maximum charge (overall or per range) that is to be generated for events using this rate. This column should contain either a single value or the same number of entries as for the RATES column. |
| RATES 252-11 | Mandatory if no CHARGE defined | Semicolon separated list of rates representing the rates for each tier (where tiered or tapered rating is employed – only a single value should be defined if this is not the case). |
| INCREMENTS 252-12 | Mandatory if RATES defined | Semicolon separated list of chargeable increments for each tier. An Increment represents the smallest quantity to be charged for. Event quantities are rounded up to the next multiple of this value before calculating a charge. |
| PRICE_POINTS 252-13 | Mandatory if RATES defined | Semicolon separated list of price points for each tier. The Price Point represents the quantity applicable to the rate. |
| RANGES 252-14 | Mandatory if RATES defined | Semicolon separated list of ranges for each tier. The Range defines the length or size of a tier or taper. This column should contain either the same number of entries as for the RATES column. In this case, the rate definition will be recycled to the beginning when an event duration or quantity exceeds the sum of the ranges defined or one less value. In this case, the last Rate will be considered to define the rate to use for the remainder of the call duration or quantity. |
| RANGES_COST 252-15 | Mandatory if RANGES defined | Semicolon separated list of amount the define cost calculated at the ranges value basing on the charging method specified applied with the tariff value configured. This column should contain the same number of entries as for the RANGES column |

Figure 5A

| PRODUCT ELIGIBILTY ||||||||
|---|---|---|---|---|---|---|---|
| PRODUCT_ID | START_DATE | END_DATE | WHAT_ID | FROM_ID | TO_ID | WHEN_ID | PRIORITY | ELIGIBILITY |
| 1 | 1990-01-01 00:00:00 | 9999-12-31 23:59:59 | 200 | 2 | 13 | 1 | 9000 | |

Figure 5B

| UTILIZATION PRODUCT INSTANCE | |
|---|---|
| Field Name | Description |
| UTILIZATION_PRODUCT_INSTANCE_ID | Instance of the bonus product. |
| PRODUCT_INSTANCE_ID | Instance of the product to which utilization product is linked. |
| UTILIZATION_PRODUCT_TYPE_ID | Type of utilization product in terms of unit (seconds, minutes, KB, SMS, etc.) and repetition (daily, monthly, weekly) and initial amount. |

Figure 7A

| UTILIZATION PRODUCT HISTORY | |
|---|---|
| Field Name | Description |
| UTILIZATION_PRODUCT_INSTANCE | Instance of the bonus product. |
| START DATE | Start date of the bonus availability |
| END DATE | End date of the bonus availability |
| LAST MODIFIED | Date of the last counter update |
| COUNTER | This field establishes the bonus threshold still available |

Figure 7B

COMPUTER-IMPLEMENTED METHOD, SYSTEM, AND COMPUTER PROGRAM PRODUCT FOR TELECOMMUNICATIONS RATING

CROSS-REFERENCE TO RELATED APPLICATION

This application is a continuation application of U.S. patent application Ser. No. 13/189,912 filed Jul. 25, 2011, which claims the priority benefit of European Patent Application No. 10 425 261.4, filed on Jul. 29, 2010, which are each incorporated herein by reference to its entirety.

TECHNICAL FIELD

The description is directed generally to distributed (multimedia) networks such as mobile networks including telecommunication services operated by mobile network operators (MNO) or mobile virtual network operators (MVNO) and, in particular, to a computer-implemented method, computer system, and computer program product for telecommunications rating.

BACKGROUND

Telecommunication services, in particular for mobile services, are nowadays often provided not only by mobile network operators (MNO) but also by mobile virtual network operators (MVNO). MNOs may refer to companies which provide frequency allocation(s) as well as the required infrastructure to run an independent mobile network. MVNOs may refer to companies that provide mobile phone services but do not have their own frequency allocation(s) of radio spectrum, nor do they necessarily have the infrastructure required to provide mobile telephone services. An MNO that does not have a frequency spectrum allocation in a particular geographical region may operate as an MVNO in that region. MVNOs may operate using any of the mobile technologies MNOs use, such as IS-95 (CDMA), GSM and/or UMTS.

Due to a large number of today's operating MVNOs, MVNOs are forced to provide their services in a cost, time and resource (in particular with regard to hardware and software resources) effective manner comprising great operational effectiveness products. One aspect to increase efficiency in provided services relates to enhanced and improved telecommunications rating.

Telecommunications rating may refer to the activity of determining the costs of a particular (phone/mobile phone) call. The costs may comprise costs (with regard to time and resources) for technical support tools such as telephone lines (e.g., mobile networks, land lines, overseas lines, etc.), service architectures, connecting services, etc. A rating process may comprise converting call-related data into a monetary-equivalent value. The performance of this rating process may require a computer system, because a huge amount of data (relating to costs associated with a call and related services) may need to be processed to calculate a (possibly) very specific rate. The data may be very detailed depending on various technical requirements and personal aspects of a user. Furthermore, providing the rating process with a computer also allows rating costs (e.g., costs relating to a call and/or related services such as a data download) to be computed during a call. In addition, a corresponding account balance for a user may be automatically updated based on the costs of the call that are associated with a large amount of data and/or information relating to the call. All related data (regarding a call, a corresponding product, and a user performing the call, hardware and/or software requirements) may be stored in a data storage device such as a database. Call-related data may be generated at various points in a network and/or measurements may be taken by third party equipment such as network probes. The data may relate to data which could be quantifiable and specific. Usage data gathered during a call may be then packaged by corresponding equipment (comprising appropriate software and/or hardware) and/or may be sent to a gateway for charging purposes.

Rating systems and/or processes may, for example, use some or all of the following types of data about a call: time properties of the call (e.g., date, time of day and day of week); amount of usage (e.g., duration of the call, amount of data charged and/or downloaded, number of messages sent); destination of the call (land line, wireless, overseas, etc.); origin of the call and/or location of the caller (this might be in particular useful in mobile networks); and premium charges (e.g., premium charges for premium content, cost of physical items such as movie tickets, etc.).

In telecommunications rating, the costs associated with an individual call operated through a subscriber (e.g., from a client system operated by a user) may be rated and then the rated amount may be sent to a billing system to provide a bill to the subscriber. The rating system and the corresponding rating process may be a module of a larger billing system.

Beyond the huge amount of individual data which need to be processed by a rating system, a rating system needs to be permanently adapted to constantly changing data (e.g., changing price polices, changing individual services charged by different users, and/or changing technical equipment supported by network operators). Hence, there is a need to provide a computer-implemented method, computer system, and computer program product which enable efficient (with regard to time and other resources) telecommunications rating comprising reusable software and/or hardware resources so as to reduce a total cost of ownership and to enable a seamless processing of huge amounts of data relating to a call, a corresponding user, requested services, and/or required equipment for network services.

BRIEF SUMMARY

According to a general aspect, a computer-implemented method for telecommunications rating (a rating method) is provided. The method may comprise: receiving an event from a source system for a service, wherein the event is generated by a user; transforming the event into a normalized event by determining event characteristics comprising determining a guiding point identifier to identify a guiding point associated with the user; by using the guiding point identifier, retrieving from the guiding point a list of products operable to guide the normalized event; rating the normalized event by calculating and aggregating costs according to the list of products; posting the costs by updating at least one balance associated with the user, the guiding point, and/or the service.

In general, rating may describe a process that calculates a charge and posts it to a balance in response to an event generated by user usage of products and services, by actions taken by a user care department, and/or by an internal event. Rating is important in revenue management processes, particularly where third-party organizations, such as content providers or roaming partners, share the revenues generated.

Basically, a rating method may be made up by four steps (receiving an (user) event, normalizing the event, rating the event, and posting the event). To provide an overall billing solution, the method steps may be integrated into other modules and/or systems of a billing and charging architecture. In particular, the method steps may be implemented for a telecommunications rating. In this way, the method ensures support for the needs of downstream systems and that they themselves are adequately supported by upstream systems.

When an event (e.g., a phone call, a request for a data download, and/or a request for a service such as a navigation service) is received by a rating and charging module, it may be analyzed in order to determine a corresponding guiding point for such an event (e.g., MSISDN, IMSI, e-mail, etc.). Once a corresponding guiding point is determined, a user for whom the event may be guided is determined (i.e., the user having performed or sent the event). Different aspects or components of the event, received by external platforms, are extracted and stored in a configuration table.

An aspect of an event may include, but is not limited to, a date and time, when the event is performed, from where and who has performed the event and to whom and to which location the event is sent. In other words, aspects of an event may characterize the event regarding what is the event about, who are the participants in the event, what are the locations of the event, when is the event performed and the event's duration. Further, these aspects may be grouped according to event characteristics (who, what, when and where)—referred to herein after as what-based event characteristics, when-based event characteristics, where-based event characteristics, and who-based event characteristics, respectively—and the event may be normalized to enable processing by the system.

The normalized event may be used to determine the charges needed to be calculated. For each charge required, a rate is derived using rating parameters, and a calculation is used to generate the charge. Rating parameters may include, but are not limited to, event types such as voice, data, SMS, MMS, event date, event time, event duration, etc. During posting, a balance against which a charge should be posted according to the event is determined. This determination of the balance might be a direct relationship between the guide point and the account to which the charges should be posted.

Hence, a huge amount of data needs to be collected and processed in order to automatically determine and charge the costs for an event. Since the method automatically determines the user and a related guiding point associated with the event, users are relieved from the mental task of specifying such relationships in order to compute and debit costs for an event. Furthermore, complex and very specific costs (depending on a plurality of different aspects) can be easily and efficiently computed. Furthermore, resources (e.g., Telco servers, band rates, telecommunication networks, etc.) can be managed in a more efficient manner. For example, resources may be provided based on user needs dependent on specific user events and/or possibly pre-selected services of users. In this manner, required land lines, mobile networks, and/or other resources can be provided such that resources are not wasted for unused or unrequested services.

According to another aspect, the transformation may be performed by mapping the event based on where-based, who-based, what-based and when-based event characteristics according to a configuration table for the event to the normalized event.

According to yet another aspect, the configuration table may be used as a mapping function having as output an internal configuration table for the normalized event.

According to yet another aspect, the list of products may be generated following a priority logic, wherein a first element in the list of products is associated with the service, a second element in the list of products is associated with the guiding point, and a last element in the list of products is associated with the user.

According to yet another aspect, rating the normalized event may further comprise checking for the products in the list of products whether the corresponding product is associated with a threshold.

According to yet another aspect, posting the costs for the event may further comprise updating a utilization threshold of the products in the list of products.

According to yet another aspect, rating may comprise applying a charging method to the products in the list of products, wherein the charging method comprises a logic for determining the costs for the event.

According to another general aspect, a computer system for telecommunications rating is provided. The system may be operable to: receive an event from a source system for a service, wherein the event is generated by a user; transform the event into a normalized event by determining event characteristics comprising determining a guiding point identifier to identify a guiding point associated with the user; by using the guiding point identifier, retrieve from the guiding point a list of products operable to guide the normalized event; rate the normalized event by calculating and aggregating costs according to the list of products; post the costs by updating at least one balance associated with the user, the guiding point, and/or the service.

According to yet another aspect, the system may be further operable to perform a method according to any one of the above specified aspects.

In another general aspect there is provided a computer-program product comprising computer readable instructions, which when loaded and run in a computer, a computer system and/or a computer network system, cause the computer, the computer system and/or the computer network system to perform a method as described.

The subject matter described in this specification may be implemented as a method or as a system or using computer program products, which may be tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further, the subject matter described in this specification can be implemented using various MRI machines.

BRIEF DESCRIPTION OF THE DRAWINGS

Details of one or more implementations are set forth in the accompanying exemplary drawings and exemplary description below. Other features will be apparent from the description and drawings and from the claims.

FIG. 1B shows a screen shot of an exemplary implementation of a user configuration table of the data model.

FIG. 1C shows a screen shot of an exemplary implementation of a guiding point configuration table of the data model.

FIG. 1D shows a screen shot of an exemplary implementation of a service configuration table of the data model.

FIG. 1E shows a screen shot of an exemplary implementation of a balance configuration table of the data model.

FIG. 1F shows a screen shot of an exemplary implementation of a product configuration table of the data model.

FIG. 1G shows a screen shot of an exemplary implementation of a utilization threshold configuration table of the data model.

FIG. 3 shows an exemplary implementation of a configuration table for defining possible compositions of events.

FIG. 5A shows an exemplary internal configuration table.

FIG. 5B shows an exemplary product eligibility table.

FIG. 7A shows an exemplary implementation of a utilization product instance table.

FIG. 7B shows an exemplary implementation of a utilization product history table.

DETAILED DESCRIPTION

Technical Terms

Figure 1A:
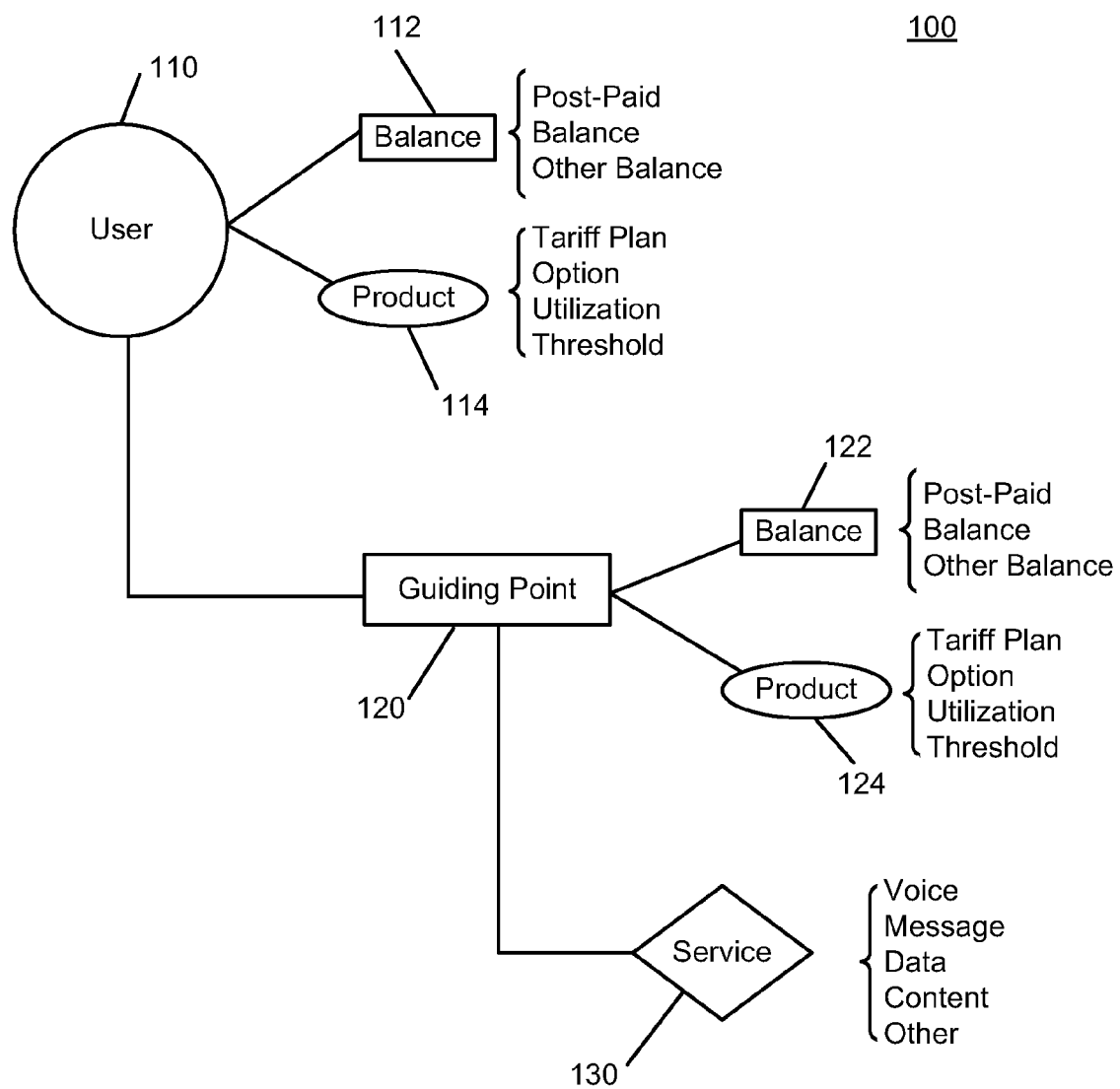
FIG. 1A shows a block diagram of an exemplary data model which may be used to implement a (telecommunications) rating method.

Following technical terms are widely used throughout the description. The terms may refer to, but are not limited to, the subsequently given explanations.

(Telecommunications) Rating

In general, telecommunications rating may refer to an activity of determining the costs of a particular call (e.g., a phone call, a mobile phone call, a call comprising a data download from a server, a call comprising access to a content database and/or to an information system). The rating method may comprise converting call-related data into a monetary-equivalent value. In one aspect, the rating method may comprise identifying a (user) event (e.g., typical events with regard to telecommunication companies, such as a call and/or a data download) received from a subscriber or an event source (e.g., a mediator, a service control platform, a service delivery platform, an internal service of a billing system comprising the rating system). The incoming event then may be rated by the rating method based on a tariff associated with a user involved in the event (e.g., the user performing the phone call). The rating may comprise calculating costs, such as a charge for the event, and posting the calculated costs to a balance. The balance may be associated with the user having generated the event, services and related products used and/or accessed by the user. Products may relate to building blocks for user offerings. A product may comprise pricing rules to be applied to a user for a service usage such as a rate plan, a recurring fee, and/or a free usage. A service may refer to a (material or non-material) good which can be provided to a user. For consumption of a service according to a performed event, a user may be charged according to pricing rules which may be defined by a service the user uses. For example, for a voice call service a user may be charged with a fee of 5 €/per month (recurring fee) and with 10 c€/per minute (rate plan).

Guiding Point

A guiding point may refer to an entity which groups one or more or all services offered or provided to a user. The guiding point may be specified and/or implemented in terms of a SIM in a Mobile Telco company, a telephone for a fixed line, and/or a CPE for an Internet Provider. A guiding point may be an entity which permits a rating system to establish and/or to specify (possibly with a high level of abstraction) one or more main rules for a rating process or method of an incoming event and the guiding point may be relative to one or more services.

In one exemplary implementation, a guiding point may comprise a set of parameters, wherein the parameters are used to identify a user requesting, using, and/or accessing services such as telecommunication services. For this purpose, i.e., to identify the user of such a service, the guiding point may comprise a list of identifiers of a SIM, for example MSISDN (mobile subscriber ISDN number), IMSI (international mobile subscriber identity), ICCID (integrated circuit card ID), etc.

Since the guiding point may be an abstract implementation concept for a rating method so as to be identifiable by a plurality to different user parameters (e.g., MSISDN, IMSI, EMAI, email, CCID, IP Address, etc.), a herein described rating method and a corresponding rating system and/or engine may be ready to charge any kind of service by only requiring to configure corresponding parameters, without any further program coding and/or implementation set ups.

Threshold/Utilization Threshold

A utilization threshold (with a zero, one or more cardinality) may model thresholds applied to a unit of measure of an entity that the threshold belongs to. Such a threshold may determine a positive and/or a negative meaning and/or interpretation for a user. A positive meaning of a threshold may permit a user to set a threshold which gives the user an ability to receive particular offers (offers on a balance and/or offers on a particular service). For example, a positive meaning of a threshold may permit a user to receive a specific basket of free SMS after the user has sent a bundle of a specific number of SMS, e.g. n SMS. A negative meaning of a threshold may refer to a threshold representing a limiting amount of use of a service. For example, a limit specified by a threshold may be applied to a SMS service. Furthermore, loyalty points may be specified using a threshold. Loyalty points may relate to a group of promotional bonus provided and/or offered to a user based on a particular threshold being reached. Utilization thresholds may be recurrent, for example, with a monthly, bimonthly, and/or weekly period. For example, a user may be forced to be under a specific threshold within a pre-determined or user-determined period of time, e.g., with regard to a monetary (or paying) aspect for a performed event.

Tariff

A tariff may relate to a specific amount of money associated with a product and/or a service which may not vary unless updated and/or changed for example on a periodic basis.

Tariff Plan

A tariff plan may relate to a bundle of one or more products with which a user is associated. A tariff plan may define in a single implementation view offerings sold to the corresponding user.

Event

An event, in the context of telecommunications rating, may relate to an interaction with a service for at least one Telco product. For example, an event may include, but is not limited to, a phone call (mobile or on the landline), a data (text, audio, video, multi-media) download, an access to a service, such as a navigation service or a ticket hotline, an access to a data source, such as an article database).

Event Source

In the context of a rating method and a corresponding rating system, an event may be received by the rating method from an event source. An event source may include, but is not limited to, a mediator, a service control platform, a service delivery platform, and or an internal source. The mediator may relate to an interface between an external system and the rating system and may direct communication between said components. A mediator may be used to schedule events to the rating system that may not be processed or may not require real-time processing such as roaming events and/or post-paid events. A service control platform may be used to schedule events to the rating system for real-time voice, data, and/or messaging events. A service delivery platform may be used to schedule events to the rating system that may be internally generated by the rating system such as an activation event, a recurring charge for an event, and/or an on-off charge for an event.

In the following text, a detailed description of examples is given with reference to the drawings. It should be understood that various modifications to the examples may be made. In particular, elements of one example may be combined and used in other examples to form new examples.

In general, the present application relates to a rating and/or charging system and a corresponding method (or process) which can be integrated into a billing system. A (standardized) interface to billing systems is provided. The system can be implemented in a SOA-based architecture (Service-Oriented Architecture) using web-based technologies. In this way, a component-based implementation model comprising a simplified infrastructure can be realized. Furthermore, an implementation of modules in the architecture using open source software products may lower a total cost of the rating system and method.

The rating system and method may be implemented on a BSS/OSS platform. BSS (Business Supported Systems) may refer to components that a telephone operator or Telco (telecommunication company) may use to run its business operations towards users. BSS may refer to systems dealing with users, supporting processes, such as taking orders, processing bills, and/or collecting payments. OSS (Operations/Operational Support Systems) may refer to computer systems used by telecommunications service providers, e.g. network systems dealing with the telecommunication company (Telco) network itself, supporting process, such as maintaining network inventory, provisioning services, configuring network components, and managing faults. BSS and OSS may be linked (to BSS/OSS or B/OSS for short) in the need to support various end-to-end services, wherein each system may comprise its own data and services responsibilities.

The rating system and method may support built-in functionality for telecommunications services so as to support complex rating scenarios including foreseen future scenarios both in the billing process as well as in the integration process into a larger system. The rating system and method may also support high flexibility and seamless integration of new functionalities due to an implementation based on an advanced integration (software and/or hardware) architecture. User functionalities may be easily implemented upon a core layer of the system. Operational effectiveness may be achieved by use of an advanced implementation in a flexible process management architecture. Furthermore, costs may be reduced due to implementations based on open source systems and software. The rating system and process may be easily expanded and/or enhanced with future trends or future generations in telecommunication networks.

FIGS. 1A to 1G show an exemplary data model with corresponding configuration tables that may be implemented in a database management system, such as a relational database management system. Other examples may comprise object-oriented databases and/or semi-structured databases.

FIG. 1A shows a data model 100 which can be used to implement a (telecommunications) rating method and to set up a corresponding rating system as described below with reference to FIGS. 2 to 8.

In general, the data model 100 may be used to associate a user 110 who accesses and/or requests a service 130 (i.e., the user performs an event, such as a phone call, a multi-media data download, and/or an access to a data source, such as an article database) with at least one corresponding product of the service 130 to serve the event, and a guiding point 120 may be used to guide the event for proper rating. The request may be performed by sending an event to a (telecommunications) service provider. An event may include, but is not limited to, a phone call, a request for a data download, a request to access a content database. Similarly, a service provider may include, but is not limited to, an Internet provider, a telecommunications company, a (virtual) network operator and/or a mobile (virtual) network operator. Once the event is sent by the user and once the guiding point has associated the event to the user and the service addressed by the event, the user may be charged for the event, i.e., the rating costs are computed. The corresponding costs of the event the user is charged for may be stored in a data storage device, such as a database. During the (automatically performed) rating method of the present invention, the event may be assigned corresponding costs for the event relating to the requested and/or accessed service.

In one example, the machine readable data model 100 may be processed in a computer system. The data model 100 may comprise a representation of a plurality of users 110, corresponding guiding points 120 and services 130 provided by at least one service provider. The data model 100 defines relationships between a user 110, a corresponding guiding point 120 for the user 110 and services 130 provided to the user 110. The guiding point 120 groups one or more or all services 130 provided by at least one service provider to a user 110. In other words, the guiding point 120 identifies the services 130 that are associated with the user 110 according to the performed event. The guiding point 120 may be for example implemented similar to a SIM (Subscriber Identity Module) provided by a telecommunication company environment or a telephone line for an Internet provider. Furthermore, the data model 100 specifies associations between an event of the user 110 that is received at one of the at least one service providers and costs that are charged for services relating to the (incoming user) event. These associations are computed at the guiding point 120.

The user 110 is specified and characterized in the data model 100 by at least one associated balance 112 and one or more products 114. The user 110 is operable to access and/or to request one or more products 114 through an event. The products 114 correspond to one or more services 130 provided by at least one service provider. For example, one or more services 130 may be associated with one product 114. The user 110 can be unambiguously identified by a set of personalized data and/or information, such as: user-specific, user-defined, personalized, and/or customized data (e.g., a name, a surname, a personal address, a billing address, etc., associated with a user) and/or additional information, such as: a fiscal code, a preferred contact, a segment (e.g., a business or consumer), a selling channel, etc., and/or by a set of event-related parameters which specify an event entry point. An event-related parameter may include a parameter comprised in the incoming event and that is matched on the guiding point 120. For example, an incoming voice event may comprise an event-related parameter in terms of an MSISDN (mobile subscriber ISDN number), which can be stored in association with the user 110 and the incoming event at the guiding point 120.

Hence, as shown in FIG. 1A, a user 110 is associated with a balance 112 and a product 114. Furthermore, the user 110 itself can be specified by a set of personalized data and/or information, such as name, surname, billing address, etc. The personalized data and/or information are stored in a configuration table in the user (object) 110 itself.

An event entry point may include one of one or more event-related parameters. The event-related parameters are defined by the guiding point 120. For example, the guiding point 120 may define an inbound event (such as an MSISDN or IMSI) as an event entry point. When an inbound event (e.g. an MSISDN, IMSI) is received, the guiding point compares the set of event-related parameters which specify an event entry point with information extracted from the event and determines whether there is a match. A match may be independent of an external source (e.g. a service) being, e.g. addressed in a (user) event.

Once the guiding point 120 has been correctly addressed (and hence correctly associated with the user 110), and thus the event sent by the user 110 is correctly associated to the user 110 and the guiding point 120, objects of the entities (e.g., user 110, balance 112, 122, service 130, product 114, 124, threshold) of the data model 100 can be accessed, and corresponding data and/or information can be retrieved according to the event. Objects may refer to concrete instances of the entities, such as user A of entity user or product X of entity product. The personalized data may also comprise a history. The history may store previous services and/or products the user has requested and/or geographical telephone connections the user is frequently using.

The balance 112 relates to a representation of the sum of credits and debits of an account of the user 110. As shown in FIG. 1A, the balance 112 may include a pre-paid balance (not shown), a post-paid balance and/or an other balance, each of which is associated with the user 110. The pre-paid balance may refer to a balance that is paid before service 130 is rendered, using, for example, a stored form of payment, such as a credit card, debit card, bank account or other payment account, that may be used repeatedly. The post-paid balance may refer to a balance for charges that are invoiced to the user 110. The invoice may be based on one or more accessed products 114 relating to at least one service 130 accessed and/or used by the user 110.

The other balance may refer to a secondary balance tracked by the system. In one preferred embodiment, the other balance relates to a promotional service. For example, the other balance may indicate an amount of money (or secondary balance) that can be used for a subset of services which can be used and/or accessed by the user 110. The other balance may be provided to the user 110 as a promotion when, for example, a certain amount of outbound traffic (expressed in units or converted to a monetary charge) has been consumed by the user 110. A difference between the other balance and a (standard user) balance may be that the former may be eligible for a subset of services usable by the user 110 and/or may be associated with an expiring date.

A product 114 may represent a tangible product that user 110 manipulates to access a service or set of services. More specifically, the product 114 of FIG. 1A may be a data structure, such as a table or matrix, that associates a service or a set of services accessed through the tangible product with costs for using the service or the set of services. As shown in FIG. 1A, the product 114 for a user 110 may be specified by a (single) tariff plan, zero or more options, and/or at least one utilization threshold.

A utilization threshold may be a limit defined by the user 110 for governing usage of the product 114. In one example, a user 110 may have asked for three utilization thresholds to monitor his spending. A utilization threshold1 may relate to a limit on SIMS during a first period of time. In this example, the utilization threshold1 is 100 minutes (on voice events) per month. A utilization threshold2 may relate to a limit on a SIMS for a second period of time. In this example, the utilization threshold1 allows 150 € of traffic per month. A utilization threshold3 may relate to a limit on data traffic over a third period of time. In this example, the user 110 may have set a limit (i.e., using utilization threshold3) of 100 MB per week on data traffic.

Continuing the above example, the user 110 may perform an 80 MB data download event. Referring to the three thresholds listed above, utilization threshold1 remains unchanged as it relates to voice traffic. Assuming the 80 MB data download event cost 25 €, the utilization threshold2 may be updated to 125 € to reflect the remainder of the limit on cost for the month (e.g., 150 € -25 €). Thus, the updated utilization threshold2 shows that the user 110 now may generate up to 125 € worth of traffic for the remainder of the month. Finally, the utilization threshold3 may be updated to reflect a remaining 20 MB (e.g., 100 MB-80 MB) limit on data traffic for the week. In other words, the user 110 may generate only 20 MB of data traffic for the remainder of the week.

Continuing further with the example, when the user 110 attempts to perform a second event, the rating method determines whether the event can be performed based on the limits set forth by each of the utilization thresholds. In particular, if the user 110 triggers a second data download event for an event "size" of 20 MB or less (e.g., a data download that is within the limit imposed by the utilization threshold3) and the event cost is under 125 € (e.g., the cost is within the limit imposed by the utilization threshold2) the rating system may perform the second event triggered by the user 110. Otherwise, if one of the limits imposed by the utilization thresholds would be exceeded by execution of the event, a notification with regard to the second event is sent to the user 110 and the rating method decides whether to terminate the event or not. In other words, in case a threshold is exceeded, an alert may be sent to the user 110 to notify that a threshold is reached or exceeded. The rating system or method may then decide whether to terminate the event of the user 110 or not.

A tariff plan of product 114 shown in FIG. 1A may define a global base price, for example, requested by a service provider for a service 130 (or for each of a plurality of associated services 130) associated with the product 114. An option to a service may be provided and/or sold to the user 110 as an additional service (e.g., a service that is in addition to the service typically provided by the product 114). Alternatively, or in addition, an option to an event may modify one or more pricing rules of an event (e.g., a phone call) performed by the user 110. Similarly, an option to a pricing rule may be a change of standard (pre-defined) pricing rules for a user 110.

For example, an option to a pricing rule for a user 110 may relate to a reduced rate with regard to the pricing rule for said user 110. For example, a user 110 has an associated recurring fee of 10 € per month for a voice service, but in case the user 110 subscribes also to a data service, the user 110 may obtain a reduction of 50% (an option) on the corresponding pricing rule. Thus, in this example, when the user 110 subscribes to a data service, the option for voice service is initiated, resulting in a recurring charge of 5 € per month for voice service instead of 10 € per month.

Pricing rules may refer to a set of rules configured in the rating system and method in order to charge services a user 110 may buy, access, and/or use. Examples of pricing rules may comprise: a recurring charge of 7 € per month for a handset rental, a voice call of 10 c€ per minute for mobile and national calls and/or 20 c€ per minute for international calls, an SMS/MMS service of 10 c€ per message, a data download of 1 € per MB, etc. The pricing rules may be coded in the rating system and method in a machine readable manner such that they can be automatically processed in the system. A plurality of options or products 114 may be associated with the guiding point 120 of the user 110.

The guiding point 120 comprises a balance 122 and a product 124 corresponding to the balance 112 and the product 114 of the user 110 associated with a service for the user 110. Accordingly, the balance 122 may comprise a pre-paid balance (not shown), a post-paid balance, and/or an other balance. The product may comprise a (single) tariff plan for a service or services, zero or more options, and/or a utilization threshold. For example, in case of a pre-paid balance used by the user 110, the computed amount to be paid (i.e., the cost) for the event is charged or debited from the user account balance 112 and respectively credited or booked at the service account balance 122 prior to use of the service 130. A post-paid balance is managed in a respective manner after the service 130 is rendered.

In other words, for each event, the guiding point 120 collects in corresponding configuration tables, data relating to the user 110 and data relating to an event, the event being sent from the user 110 to the service provider as a request for one or more services 130. The guiding point 120 further manages data in a configuration table for each service 130 which receives the event to calculate costs associated with the event.

The guiding point 120 may be associated with one or more services 130, the one or more services 130 being provided by one or more service providers and requested by the user 110 when the user 110 sends an event to the service provider. Examples of services 130 that can be requested by the user include: voice phone calls, audio and/or video data services (such as video conferences), messages (such as SMS services), data charging and/or download (e.g., music, video, multi-media data), and/or content access (e.g., to content databases).

The data model 100 may be implemented on a data storage device, such as a database management system. In one exemplary implementation, each of the different entities shown in FIG. 1A, such as user 110, guiding point 120, service 130, balance 112, 122, product 114, 124 is implemented by a corresponding configuration table (e.g., a relational table in a relational database management system or MSExcel spreadsheet). The configuration tables, as exemplary shown in FIGS. 1B to 1G, may define, for each of the shown entities, types of the data model 100 and related methods which are necessary to implement the rating method and system of the present invention.

FIGS. 1B to 1G show exemplary configuration tables to implement the entities of the data model 100 shown in FIG. 1A. In particular, FIG. 1B shows a screen shot of an exemplary implementation or configuration of a user entity (or user) 110, i.e., a user configuration table 111 of the data model 100. The user configuration table 111 may comprise data types which are specified in field names, such as Customer_ID, Name, Surname, Customer_Status_Code, Start_Date, End_Date, Customer_Type_ID, which store corresponding values for each of the users 110 as exemplary shown for one user 110 in FIG. 1B.

FIG. 1C shows a screen shot of an exemplary implementation or configuration of a guiding point entity (or guiding point) 120, i.e., a guiding point configuration table 121 of the data model 100. The guiding point configuration table 121 may comprise data types which are specified in field names, such as Guiding_Point_ID, Guiding_Point_Status_Code, Start_Date, End_Date, Service_Name, Network_Name, Guiding_Point_Type_ID, Guiding_Point_A, Guiding_Point_B, which store corresponding values for each of the guiding points 120 as exemplary shown for one guiding point 130 in FIG. 1C.

FIG. 1D shows a screen shot of an exemplary implementation or configuration of a service entity (or service) 130, i.e., a service configuration table 131 of the data model 100. The service configuration table 131 may comprise data types which are specified in field names, such as Service_ID, Service_Type_ID, Start_Date, End_Date, Service_Status_Code, which store corresponding values for each of the services 130 as exemplary shown for one service 130 in FIG. 1D.

FIG. 1E shows a screen shot of an exemplary implementation or configuration of a balance entity (or balance) 112 and 122, i.e., a balance configuration table 113 of the data model 100. The balance configuration table 113 may comprise data types which are specified in field names, such as Balance_ID, Balance_Type_ID, Amount, Balance_Limit, Customer_ID, Guiding_Point_ID, which store corresponding values for each of the balances 112 as exemplary shown for one balance 112 in FIG. 1D.

FIG. 1F shows a screen shot of an exemplary implementation or configuration of a product entity (or product) 114 and 124, i.e., a product configuration table 115 of the data model 100. The product configuration table 115 may comprise data types which are specified in field names, such as Rating_Items_ID, Rating_Items_Status_Code, Start_Date, End_Date, Customer_ID, Guiding_Point_ID, Service_ID, Name, Description, which store corresponding values for each of the products 114 as exemplary shown for one product 114 in FIG. 1F.

FIG. 1G shows a screen shot of an exemplary implementation or configuration of a utilization threshold entity (or utilization threshold), i.e., a utilization threshold configuration table 117 of the data model 100. The utilization threshold configuration table 117 may comprise data types which are specified in field names such as Utilization_Threshold_ID, Start_Date, End_Date, Customer_ID, Guiding_Point_ID, Service_ID, Counter, UOM, Utilization_Threshold_Type_ID, which store corresponding values for each of the utilization thresholds as exemplary shown for one utilization threshold in FIG. 1G.

Each of the configuration tables 111, 121, 131, 113, 115, 117 according to FIGS. 1B to 1G for implementing the data model 100 comprise one or more field variables (names) which can be populated by different values "Example values" as exemplary shown in the respective figures. Furthermore, for each field name (or variable) "Field name" a description "Description" is provided in the respective configuration table.

Figure 2:
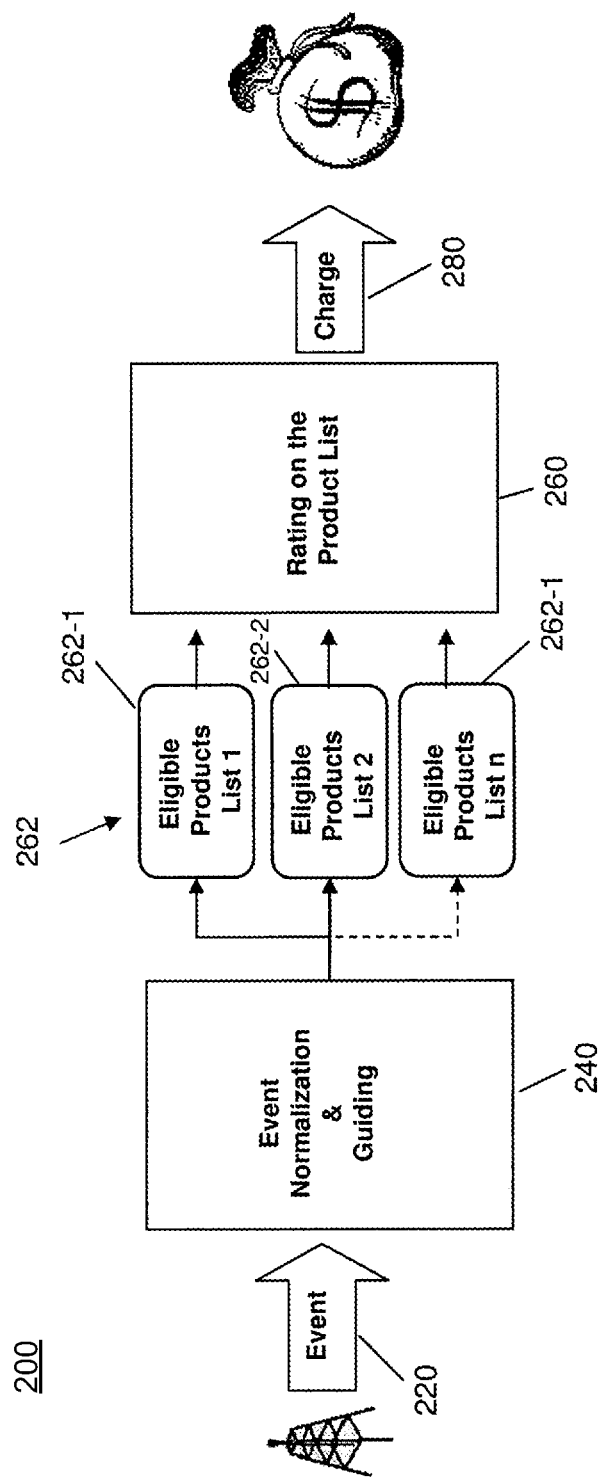
FIG. 2 shows a flow diagram of an exemplary implementation of a (telecommunications) rating method.

FIG. 2 shows a telecommunications rating method (or "rating method") 200, which can be implemented based on the data model 100 shown in FIG. 1A. The rating method 200 comprises the steps of receiving an event from an event source at step 220, normalizing and guiding the event at step 240, rating the event at step 260 and generating a list of products for the event at step 262, and posting the event against the balance 112 of the user 110 for charging purposes at step 280.

The rating method 200 may be implemented in a rating system (process engine or engine) which may be incorporated into a larger system, such as a billing system. In one exemplary implementation, the billing system may be implemented within or as part of (e.g., a module in) a BSS (Business Support System) or a B/OSS (Business/Operations Support System) operated by a service provider. Some exemplary service providers include an Internet provider, a telecommunication company, a (virtual) network operator, a mobile (virtual) network operator, etc.

An event (e.g., a phone call, a request for a data download, a request to access a content database) sent by and/or performed by a user from a source system (such as an event source or a data source) is received at the rating system at step 220. Source systems from which the rating system may receive events at step 220 may comprise a mediator (e.g., for events that may not require or may not be processed in real time, such as roaming events, postpaid events, etc.), a service control platform (e.g., for real time voice, data, and/or messaging events), a service delivery platform (e.g., for content and/or m-commerce events), an internal system (e.g., for events that are internally generated by the rating system), and/or other systems. The mediator may define a communication interface for coordinating communication including, for example, data exchange between, e.g., the event source (or source system) and the rating system (which implements the rating method 200).

The method steps 220, 240, 260, 280 of the rating method 200 are described in greater detail with reference to FIGS. 3 to 8. FIG. 3 shows an exemplary implementation of a configuration table 230 for defining events. The configuration table 230 may include one or more field names 232. In accordance with one embodiment of the present invention, each field name 232 may have an associated description 234. The configuration table 230 specifies one exemplary implementation of CDR (call data records or call detail records) types (i.e., an event format) usable for events which can be processed in the rating method 200. Although an exemplary implementation based on CDR is discussed herein, one of ordinary skill in the art will appreciate that other implementations may be used consistent with embodiments of the present invention.

CDR relates to a widely used standard for Telco services. The configuration table 230 may be used to collect and store required data relating to an event received at step 220 and to collect and store required data relating to a corresponding user 110 having performed the event. The data stored in the configuration table 230 may be used in the subsequent method steps 240, 260 and 280 of the rating method 200. Hence, the configuration table 230 serves as an efficient, flexible and reusable tool for collecting and storing event-related data and user-related data of an event received at step 220 without requiring much memory space.

Types of events are specified in different fields of the shown tables and thus associated to field names in the table such as RECORD_TYPE, EVENT_TYPE, CALLING_SERVICE_NAME, TIME_BAND, DURATION, may be listed in a field name attribute 232 with a corresponding description given in the field description attribute 234. The configuration table 230 can be implemented in a data storage device, such as a database management system. The exemplary CDR fields of a common configuration table 230 for event-related data of an event and user-related data of a user 110 associated with the event are discussed in greater detail below.

The configuration table 230 may include a field name 232, such as EVENT_TYPE, that indicates an event typology. An event typology or event type may specify a type of service related to the event. For example, the EVENT_TYPE may identify any of the following types of services and/or formats: voice, video, audio, SMS, MMS, data, and content. More complete, examples of event typologies may include: Service: Voice→Event Typology: National Mobile Call, National Fixed Call (such as a landline call), International Call, etc.; Service: Messaging→Event Typology: National SMS, International SMS, MMS, etc.; and Service: Data→Event Typology: Browsing, Downloading, etc.

Other types of events specified in the field names 232 in the configuration table may or may not depend on the value of EVENT_TYPE. In one embodiment of the present invention, configuration table 230 may include one or more of the following field names 232 that are independent of the specified event typology: CALLING_SERVICE_NAME may comprise a telephone number of the USIM (Universal Subscriber Identity Module) that executes an event; CALLING_NETWORK_NAME may comprise the IMSI (International Mobile Subscriber identity) of the USIM that executes an event; CALLED_SERVICE_NAME may comprise a service identifier for the event receiver, such as a telephone number of the USIM that receives an event; CALLED_NETWORK_NAME may comprise a network identifier for the event receiver, such as the IMSI of the USIM that receives an event; CALLING_NETWORK may comprise an identifier that represents a network of the caller; CALLED_NETWORK may comprise an identifier that represents a corresponding network of an event receiver (e.g., a service provider); NETWORK_TYPE may depend on a typology of a network system used by an event and may relate to: GSM (Global System for Mobile Communications), UMTS (Universal Mobile Telecommunications Service), or Satellite; NETWORK_ID may specify an identifier of a network used for an event (such as a Mobile Switching Center (MSC) address); EVENT_START_DATE may specify a timestamp (date and time) at which an event starts; TIME_BAND may specify the Universal Coordinated Time (UCT) or other time standard; PRICE may specify a monetary amount associated with an event; CURRENCY_ID may identify a currency associated with the monetary amount in the PRICE field; and SESSION_ID may comprise a unique identifier for an event.

The configuration table 230 also may include one or more field names 232 that are dependent on the event typology or type of event, such as, but not limited to, RECORD_TYPE. The following description illustrates how a selection of field names 232 and value of field names 232 may vary depending upon the event typology.

For example, if the event type or typology relates to a service requiring voice and/or video data, then some field names 232 may include: RECORD_TYPE, EVENT_TYPE and DURATION. RECORD_TYPE may comprise values such as: Mobile Terminated Call, Mobile Originated Call, Mobile Terminated Call TAP IN (e.g., a mobile terminated call which can be electronically saved and/or recorded), Mobile Originated Call TAP IN (e.g., a mobile originated call which can be electronically saved and/or recorded), Call Forward, Call Forward TAP IN (e.g., a call forward which can be electronically saved and/or recorded), SSP (Subscriber Service Procedure) (a SSP may include but is not limited to a technical subscription of a user on a telecommunication network), SSP (Subscriber Service Procedure) TAP IN. EVENT_TYPE may comprise values such as: Voice Call, Video Call, All Teleservices. DURATION may comprise a number of units representing duration of an event (e.g., seconds).

In contrast, if the event type or typology relates to a message service requiring SMS and/or MMS data, field names 23 may include: RECORD_TYPE, EVENT_TYPE, PULSES and VOLUME. RECORD_TYPE may comprise values such as SMS Mobile Originated, SMS Mobile Terminated, Originating MMS, Recipient MMS, Forwarded SMS, Forwarded MMS. EVENT_TYPE may comprise values such as Alert, Attachment, Audio, Group, Group Attachment, Group Audio, Group Multiple Attachments, Group Multiple Attachments with Video, Group Picture, Group Video, Multiple Attachments, Multiple Attachments with Video, Multiple Recipients Group Reminder, Normal, Picture, Video. PULSES may comprise a number of units of an event. VOLUME may comprise a number of units, in bytes, of an event.

In the above example, the possible values for the field names 232 RECORD_TYPE and EVENT_TYPE changed when the type of service associated with the event changed from voice to message. In addition, some variance in the field names 232 chosen to describe the event occurred. As shown above, the field name 232 DURATION was used for the event typology related to voice, whereas PULSES and VOLUME where used to measure events related to a messaging service.

Continuing further with the example, if the type of an event relates to data service, the following values for corresponding event types of the table 230 in FIG. 3 may be supported. RECORD_TYPE may comprise values such as Home Public Land Mobile Network (HPLMN) GGSN (Gateway GPRS Support Node) session, Visited Public Land Mobile Network (VPLMN) GGSN session, HPLMN SGSN (Serving GPRS Support Node) session PPP (point-to-point protocol), VPLMN SGSN session PPP, CHAT. ACCESS_METHOD may comprise an access method used for a service requested with a corresponding event. APN_CODE may comprise an access point name. VOLUME may comprise a number of units, in bytes, of an event.

Similarly, if the type of an event relates to content, the following values for corresponding event types of the table 230 in FIG. 3 may be supported. RECORD_TYPE may comprise values such as: Atomic Priced, Atomic Unpriced. An atomic priced or unpriced event may include no duration and may be not further divisible. An example of an atomic event may include, but is not limited to, a SMS or an MMS. An atomic priced event may relate to an event wherein its price is decided outside the rating method, wherein the rating method then applies said price (or charge) to the atomic event without additional calculations. An atomic priced event may relate to an event which is rated by the rating method as no external price is decided and associated with the event. EVENT_TYPE may comprise values such as Sport, Music, Books, News, Sport News, Games, Video community, Video rental store. PULSES may comprise number of units of an event such as a frequency of events.

In principle, a type of an event (or an event typology) may be either a usage event or a non-usage event. Usage events may be generated by a user and/or by a network event (or activity). Usage events may comprise voice, data, messaging, content, and/or other events. Non-usage events may refer to events that are neither generated by a user nor by a network event (or activity). Non-usage events may comprise activation (e.g., the event is generated during the activation of a guiding point, product, service or any other feature), recurring (e.g., an event that is generated and charged periodically (during billing phase) in return for the provision of a product or service such as product subscription, device rental), and/or on-off (e.g., the event is generated in response to an ad-hoc action and charged only once) events. Charges for a usage event may be calculated in one or more of the following ways: Duration: the charge is calculated using a duration-specific rate and the duration of the event (e.g., phone call, data session); Flat Rate: the charge is a flat amount (i.e., the rate) for the whole event (e.g., an SMS message), irrespective of duration or volume; Volume: the charge is calculated using a volume-specific rate and the volume of data transferred during a session; Content: the charge is calculated using a content-specific rate and a number of units of measure of content specified by the event (e.g., per bullet fired in a game, the event being the bullet fired in the game); and Pre-Rated: the charge is taken directly from the event and may be re-rated, marked up, marked down or left unchanged.

After the event is received in the rating method 200, the event is normalized and guided at step 240. In general, aspects of the incoming event exemplary shown in the configuration table 230 for CDR (call data record) as some of the field names 232 are evaluated according to who, what, when and where event characteristics and the event is normalized to a normalized event. The normalized event can be processed in the rating system. Furthermore, for the normalized event a list of one or more products is retrieved. This list of products is used by the guiding point 120 to guide the normalized event. In other words, a normalized event is an event which has been translated from an event format used by an external system for describing the incoming event into the internal format used by the rating method and system according to the 4W model. During guiding, as performed at the guiding point 120, a match between the normalized event and the related guiding point 120 is found by using a guiding point identifier, which comprises but is not limited to an MSISDN, an IMSI, and/or an ICCID identifier.

In one exemplary implementation, an event is normalized using who-based, what-based, where-based and when-based event characteristics. In one example, a user (John) who is geographically located in New York may use a mobile device to call Maggie who is in Los Angeles at 11:00 a.m. To normalize the exemplary mobile voice call, the described event may be mapped using the following parameters or event characteristics: Who: John which can be for example retrieved from the WHAT field in configuration table 250, What: Mobile Voice Call as specified, e.g., in the WHAT field of configuration table 250, Where: from New York to Los Angeles as specified, e.g., in the FROM and TO fields of configuration table 250, When: daily time band (08.00 a.m.-08.00 p.m. daily, 08.00 p.m.-08 a.m. nightly) as specified, e.g., in the WHEN field of configuration table 250.

Figure 4:
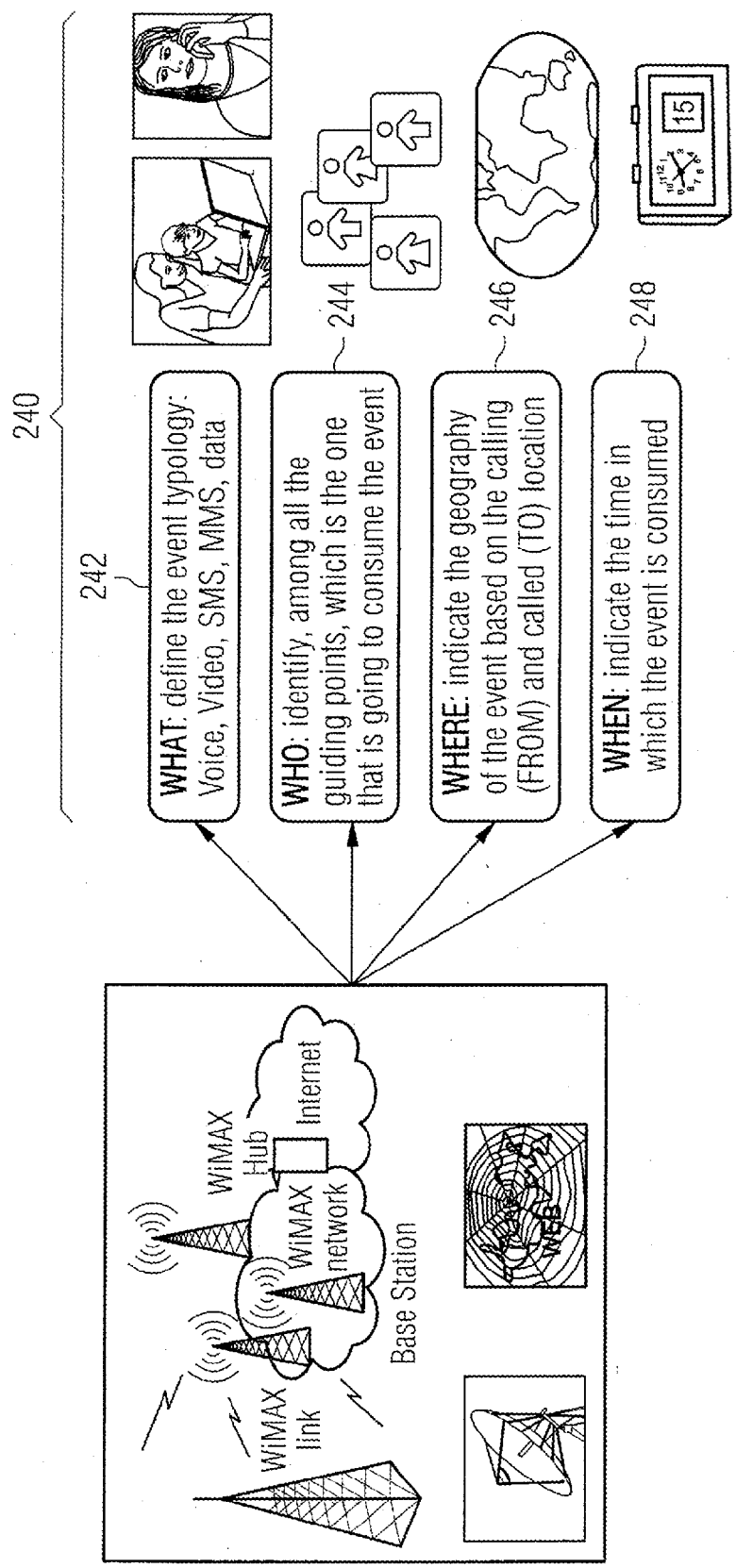
FIG. 4 shows exemplary aspects used to perform the step of event normalization and guiding of the rating method.

In the normalization step 240, one or more of the field names 232 in the configuration table 230 may be mapped to an internal configuration table, such as table 250 shown in FIG. 5A (described below). In particular, during the normalization step 240, each aspect of the incoming event (previously entered into the configuration table 230 as some of the field names 232) may be analyzed according to a 4W model (i.e., what-based event characteristics 242, who-based event characteristics 244, where-based event characteristics 246, and when-based event characteristics 248) as shown in FIG. 4. In this manner, aspects of an incoming event relating to what-based event characteristics 242 may be grouped, aspects relating to who-based event characteristics 244 may be grouped, aspects relating to where-based event characteristics 246 may be grouped and aspects relating to when-based event characteristics 248 may be grouped.

Referring to the example of the CDR configuration table 230 as shown in FIG. 3, the field names 232 may be grouped according to the 4W model as follows:

The field names 232 RECORD_TYPE 232-1, EVENT_TYPE 232-2, NETWORK_TYPE 232-7, ACCESS_METHOD 232-11 of CDR configuration table 230 are mapped to the field name 252 WHAT 252-1 of the internal configuration table 250 for the normalized event. These aspects of the event may refer to what-based event characteristics 242.

The field names 232 CALLING_SERVICE_NAME 232-3, CALLING_NETWORK_NAME 232-4 of CDR configuration table 230 are mapped to the field name 252 WHAT 252-1 of the internal configuration table 250 for the normalized event. These aspects of the event may refer to who-based event characteristics 244.

The field names 232 CALLED_SERVICE_NAME 232-5, CALLED_NETWORK_NAME 232-6, APN_CODE 232-10, NETWORK_ID 232-12 of CDR configuration table 230 are mapped to the field name 252 FROM 252-2 and TO 252-3 of the internal configuration table 250 for the normalized event. These aspects of the event may refer to where-based event characteristics 246.

The field names 232 EVENT_START_DATE 232-13, TIME_BAND 232-14 of CDR configuration table 230 are mapped to the field name 252 WHEN 252-4 of the internal configuration table 250 for the normalized event. These aspects of the event may refer to when-based characteristics 248.

The grouped aspects may be entered into an internal configuration table, such as internal configuration table 250 exemplary shown in FIG. 5, thereby normalizing the incoming event to a normalized event. The normalized event can be used in the subsequent steps 260, 280 of the rating method 200. Hence, the configuration tables are used during the normalization phase 240 in a mapping function having as input parameters values of aspects used in a representation for the incoming event in the source system according to configuration table 230 and as output parameters values of fields used in configuration table 250 of the rating method 200. The mapping function may be defined by one or more mapping rules.

As described above, not all field names 232 relate to the 4W model. Other parameters, such as DURATION, VOLUME, PULSES, PRICE, CURRENCY_ID and SESSION_ID, may not be normalized according to the 4W model, but rather may be used during the posting step 280, in which a charge is posted to a user.

In one exemplary implementation, the configuration table 230 is used to specify aspects relating to what-based event characteristics 242. Aspects relating to what-based event characteristics 242 of the incoming event may relate to an event typology, such as that the incoming event 220 relates to voice, video, audio, SMS, MMS, data, content, etc. What-based characteristics 242 may include, but are not limited to, the following aspects (exemplary shown as field names 232 in FIG. 3): RECORD_TYPE 232-1, EVENT_TYPE 232-2, NETWORK_TYPE 232-7, and ACCESS_METHOD 232-11.

A RECORD_TYPE 232-1 may relate to a record typology. A record typology or record type may include but is not limited to a definition which is used for describing an event, e.g., mobile original call (MOC), mobile terminated call (MTC), and/or call forward. An EVENT_TYPE 232-2 may relate to an event typology. An event typology may indicate, for example, that the incoming event relates to voice, video, audio, SMS, MMS, data, content, etc. A NETWORK_TYPE 232-7 may relate to a network topology such as GSM, UMTS and satellite. Finally, an ACCESS_METHOD 232-11 may relate to a method used to access the service associated with the event. One of ordinary skill in the art will appreciate that other what-based event characteristics 242 are consistent with the present invention.

For each event, the what-based event characteristics 242 (e.g., RECORD_TYPE 232-1, EVENT_TYPE 232-2, NETWORK_TYPE 232-7, and ACCESS_METHOD 232-11) are identified by the system used by the incoming event. Corresponding values for each what-based event characteristic of the incoming event are collected from the event and stored in association with the corresponding field names 232 in the configuration table 230.

The collected and stored values corresponding to what-based event characteristics 242 may be used in further processing steps of the rating method 200. The further processing steps may be managed and processed at a guiding point 120 of a corresponding user 110 who is associated with the incoming event (i.e., the user 110 having performed the incoming event).

In order to determine a guiding point 120 which performs an incoming event and to charge a user who owns and/or who is associated with the guiding point, within a corresponding configuration table (e.g., 230) of the event a field name 232 is determined which matches one of the guiding point identifiers. A particular set of field names 232 of the configuration table 230 to be used may vary depending on the what-based characteristics, such as event typology specified by the field name EVENT_TYPE. Therefore, during normalization of the incoming event, the rating method 200 determines what-based related characteristics of the incoming event.

The aspects specifying what-based event characteristics can also be used to determine which field of the configuration table may be used to find the corresponding guiding point for the event and the associated user. For example, for a mobile national voice event (i.e., what-based event characteristics), the field name 232 of the configuration table 230 which can be used to determine the user having performed the event is CALLING_NETWORK_NAME 232-4 (IMSI of the SIM). The value for the CALLING_NETWORK_NAME 232-4 will be used to retrieve, during a rating step of the method 200, a related guiding point. After the related guiding point is identified, the user having performed the event (e.g., the user who should be charged) can be retrieved. That is, the CDR configuration table 230 is used to access and to extract the aspects related to the user having performed the event which are specified in the CALLING_OPERATOR_ID 232-8.

In one exemplary implementation, the configuration table 230, as received with the incoming event, is used to define aspects relating to who-based event characteristics 244. Who-based characteristics 244 of the incoming event may relate to an identity of a user 110 having sent the event and a corresponding guiding point 120 of the user 110. Who-based characteristics 244 may include, but are not limited to, the following aspects (exemplary shown as field names 232 in FIG. 3): CALLING_SERVICE_NAME 232-3, CALLING_NETWORK_NAME 232-4, CALLED_SERVICE_NAME 232-5, and CALLED_NETWORK_NAME 232-6.

CALLING_SERVICE_NAME 232-3 may relate to a service identifier for the event sender. For example, the CALLING_SERVICE_NAME 232-3 may identify a service for the user having sent the event. CALLING_NETWORK_NAME 232-4 may relate to a network identifier for the event sender. For example, CALLING_NETWORK_NAME 232-4 may identify a network being used by the user to send the event. CALLED_SERVICE_NAME 232-5 may relate to a service identifier for the event receiver. For example, CALLED_SERVICE_NAME 232-5 may identify a service for the user having received the event. CALLED_NETWORK_NAME 232-6 may relate to a network identifier for the event receiver. For example, CALLED_NETWORK_NAME 232-6 may identify a network being used by the user having received the event.

Based on a specification rule as implemented in a mapping function to map aspects of configuration table 230 describing the incoming event to aspects of configuration table describing the corresponding normalized event, aspects associated with the who-based event characteristics 244 also may be used to determine a guiding point identifier to identify the guiding point 120 corresponding to the identified user 110. The guiding point identifier may be used to retrieve further data relating to the incoming event which may be necessary for further processing in the rating method 200. For example, the guiding point identifier can be used to retrieve one or more products which correspond to the user 110 and the incoming event during the guiding and normalization step 240. The one or more products may be retrieved by using the guiding point identifier to access configuration tables of the guiding point 120, such as the guiding point configuration table 121 shown in FIG. 1C, wherein the guiding point identifier may be specified in the field Guiding_Point_ID. In addition, the guiding point identifier may be used to retrieve an account balance 114 corresponding to the user 110 and the incoming event during the posting step 280.

Aspects relating to where-based event characteristics 246 of the incoming event may relate to a geographical identification of the incoming event with respect to geographical location from where the event 220 has been sent and to a geographical location to where the event 220 is directed. In one exemplary implementation, aspects relating to where-based event characteristics 246 may include the following field names 232: CALLING_OPERATOR_ID 232-8 (or CALLING_SERVICE_NAME 232-3), ACCESS_METHOD 232-11, NETWORK_ID 232-12, NETWORK_TYPE 232-7, APN_CODE 232-10, CALLED_OPERATOR_ID 232-9 (or CALLED_SERVICE_NAME 232-5). Event characteristics which relate to aspects determining the geographical location from which the event is received may be determined from the values corresponding to the event types CALLING_OPERATOR_ID 232-8 (or CALLING_SERVICE_NAME 232-3), ACCESS_METHOD 232-11, NETWORK_ID 232-12, NETWORK_TYPE 232-7 in the configuration table 230. Event characteristics which relate to aspects determining the geographical location to which the event is addressed may be determined from the values corresponding to the event types APN_CODE 232-10, CALLED_OPERATOR_ID 232-9 (or CALLED_SERVICE_NAME 232-5) in the configuration table 230.

The values according to where-based event characteristics 246 retrieved from the incoming event may be used in subsequent processing steps of the rating method 200. For example, the values can be used in a tariff plan configuration table relating to corresponding products of the incoming event to specify different costs for a product (which relates to the event) dependent on the geographical data.

Aspects relating to when-based event characteristics 248 of the incoming event may relate to a time and a date of the incoming event. In one exemplary implementation, the configuration table 230 is used to determine aspects relating to when-based event characteristics 248 and may be based on one or more of the following event types and corresponding values: TIME_BAND 232-14, EVENT_START_DATE 232-13, and DURATION 232-15.

Based on the when-based event characteristics 248, a list of dates into which the event falls can be determined, such that a time interval of the event may be computed by adding the duration value of the DURATION field name to the value for the start date and time of the EVENT_START_DATE 232-15 field name. The time interval (date and time value) may be converted to one or more segments or sections of time intervals depending on time band values specified by the TIME_BAND 232-14 field name for the event. For example, a telephone call starting on a Sunday night and ending on a Monday morning may comprise a TIME_BAND 232-14 value for Sunday and another TIME_BAND 232-14 for Monday. The when-based based characteristics 248 for the event may then be mapped to a tariff plan configuration table (not shown) of a product 114 corresponding to the event. The mapping may be performed by a mapping rule specified in the mapping function used during the normalization step 240. The tariff plan configuration table may be retrieved, using the guiding point identifier, from a guiding point 120 associated with a user 110 having generated the event. The tariff plan configuration table may specify different costs for the one or more different segments or sections of the time interval describing the event which correspond to different dates and times according to TIME_BAND values. For example, a segment of a time interval representing one day may include for example a sub-interval of the time interval day from 8 to 10 a.m. and from 4 to 6 pm of said time interval.

In one example consistent with embodiments of the present invention, associated pricing in a corresponding tariff plan configuration table may specify a pricing value for the TIME_BAND 232-14 value Sunday different from a pricing value for the TIME_BAND 232-14 value Monday (e.g. phone calls are cheaper on Sundays than on Mondays). As explained above, the associated configuration tables for a user such as the user configuration table 111 as shown in FIG. 1B can be retrieved from the guiding point based on the above described who-based event characteristics 244 and, in particular, by using the guiding point identifier.

For each of the above described characteristics 242, 244, 246, 248, the corresponding values of the incoming event are collected and after the above described mappings (or mapping function) using configuration table 230 according to the described what-based, who-based, where-based and when-based event characteristics 242, 244, 246, 248, the values are stored according to column names 252 in a configuration (or rating) table 250 as shown in FIG. 5A. What-based event characteristics 242 are stored within a WHAT field 252-1 in the configuration table 250. Who-based event characteristics 244 are stored accordingly with respect to the what-based event characteristics 242. Where-based event characteristics 246 are stored within a FROM field 252-2 and a TO field 252-3 in the configuration table 250. When-based event characteristics 248 are stored within a WHEN field 252-4 in the configuration table 250.

Once the normalization phase of an (incoming user) event has been completed, the corresponding normalized event (comprising one or more internal events) according to the 4W model has been determined. Parameters (of the normalized event) relating to who-based related characteristics 244 of the event can be used to identify a corresponding guiding point for the event and the user having triggered the event and thus the user to be charged, and/or a list of products linked to or associated with the guiding point. Other parameters (of the normalized event) relating to what-based 242, where-based 246 and/or when-based 248 related characteristics of the event can be used to determine which of the products in the list of products associated with the user may be used for pricing rules.

The list of products associated with the normalized event (or more precisely each list of products associated with each internal event comprised in the normalized event) are sorted using a priority parameter (e.g., a number, associated to each product such that the smaller the number is of the product the better is the priority of the product). The priority parameter may be defined in a priority table associated with products.

After having normalized the event, a match for each product from the list of products regarding what-based, where-based, and when-based related characteristics are specified in a product eligibility table as exemplary shown in FIG. 5B. Returning to FIG. 2, after the event is received in the rating method 200 and after the event is normalized and guided at step 240, the event is rated at step 260. In general, during event rating step 260, costs relating to the event are calculated. Based on the retrieved values according to the what-based 242, who-based-244, where-based 246, and when-based 248 event characteristics retrieved from the incoming event using the configuration table 230 as shown in FIG. 3, costs for the service or services 130 addressed by the event 220 are retrieved using the guiding point 120 corresponding to the user 110 having sent the event 220. The guiding point 120 is determined using the guiding point identifier as determined during the event normalization and guiding step 240.

Using the specified association between the incoming event, the user 110 of the event, the guiding point 120 of the user 110 and the corresponding services 130 accessed or used, one or more products associated with the guiding point 120 of the user 110 corresponding to the incoming event are retrieved.

The one or more products are sorted in a list 262. In one exemplary implementation, the list of products 262 for the event which has been previously normalized is constructed based on priority logic. The list of products 262 is prioritized according to the priority logic as follows: a first element 262-1 in the list of products 262 may be bound to a service being accessed and/or used by the event; a second element 262-2 in the list of products 262 may be bound to a corresponding guiding point; and a last element 262-n in the list of products 262 may be bound to the user having generated the event. Once a product relating to an event is determined, parameters to access the configuration table 250 have been retrieved so as to determine one or more pricing rules for the currently performed event.

Figure 6:
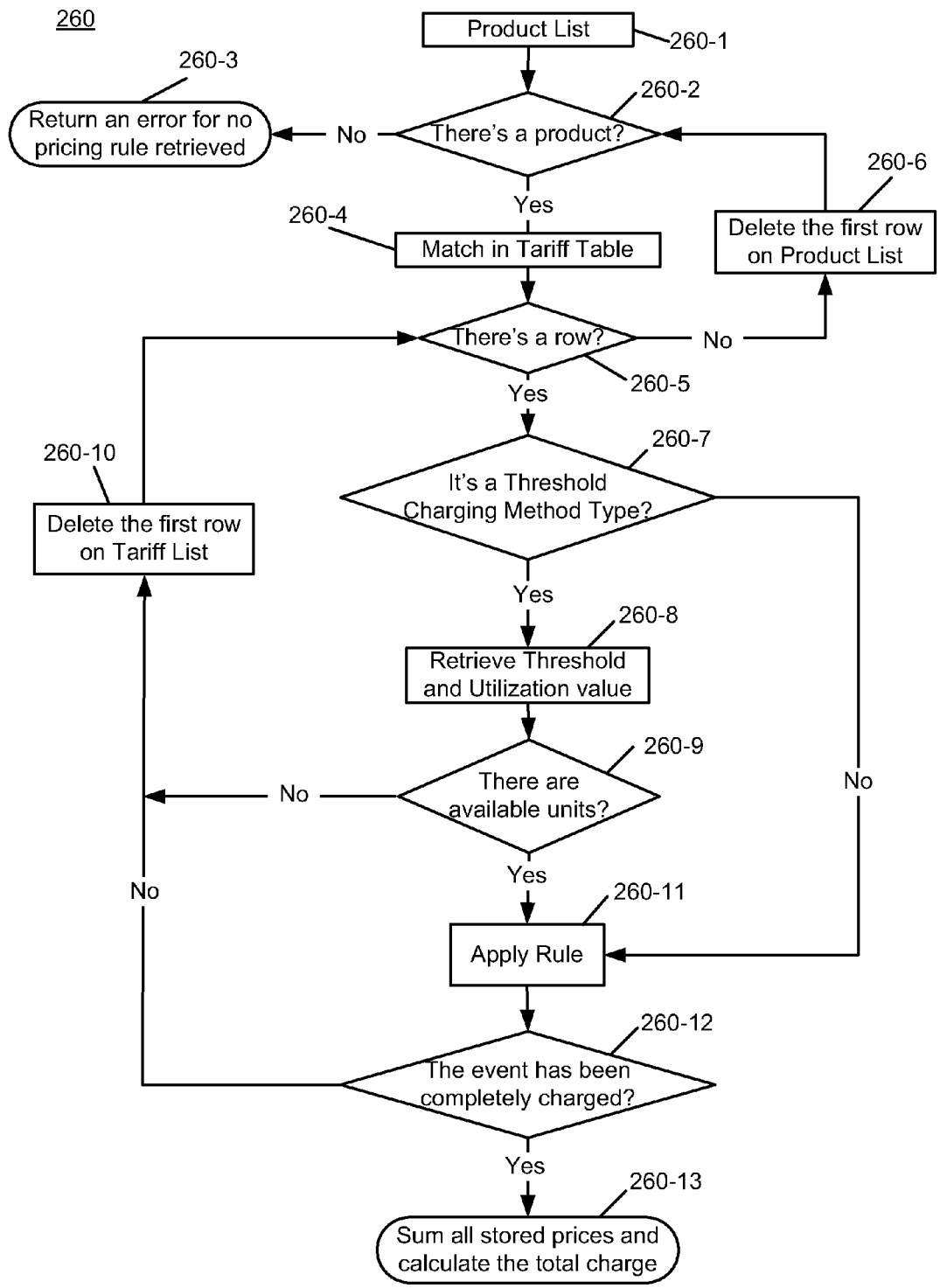
FIG. 6 shows a flow diagram of an exemplary implementation of the event rating step in the rating method.

With reference to FIG. 6, an example of the rating of the event 260 based on the list of products 262 is shown in greater detail. The event rating step 260 may be performed based on the configuration table 250 as shown in FIG. 5A.

At 260-1, a list of products 262 is received by the method 260. At 260-2 it is determined whether the list of products 262 comprises any products (i.e., whether the list of products is empty or not). In case the list 262 is empty, an error is returned indicating that no pricing rule for a product can be applied 260-3. Otherwise, if the list of products 262 is not empty, a first product in the list 262 is matched against the configuration table 250 wherein data stored in relation to the WHEN field 252-4 is used.

Hence, a matching in a configuration table 250 with regard to the 4W model for the normalized event is performed. In other words, the characteristics according to the 4W model of the normalized event (and comprised one or more internal events in the normalized event) are associated to the first product in the list of products and a search on a corresponding pricing configuration table is performed. This search results in a list of rows (comprising a sequential number and a charging method for determine the price). Based on the CHARGING_METHOD 252-7 field of the configuration table 250, zero, one or more rows which specify tariff rules for the product are returned. The tariff rules are checked during the processing at 260-5. The CHARGING_METHOD 252-7 and related aspects are described further below.

In case there is no further row associated with the product, the currently processed product is deleted from the list of products and the next product in the list of products 262 is processed 260-6. Otherwise, a value from the first row of the currently processed product is extracted and possibly also a corresponding price is stored. At 260-7, it is checked whether the currently processed product from the list 262 is associated in the CHARGING_METHOD field 252-7 with a threshold charging method type. If this is the case, the product is related to a tariff which is based on a threshold or the product is related to a tariff which lies under or above the threshold. Then the threshold associated with the product, e.g., in terms of a threshold logic comprising, e.g., tiered threshold, tapered threshold, tiered under, and/or tapered under and a utilization product associated to or related to the currently processed product are retrieved at 260-8.

At 260-9, units available for the threshold and utilization values are retrieved. In case no units are available for the threshold and utilization values, the corresponding row in the tariff list associated with the currently processed product is deleted at 260-10 and the process is returned to step 260-5 where a next row in the tariff plan of the currently processed product is processed. Otherwise, if this is not the case, the charging rule stored with the product in the CHARGING_METHOD field 252-7 of the configuration table 250 is applied to the currently processed product, 260-11. At 260-12 it is checked whether the list of products 262 relating to the event has been completely rated. If this is the case, all prices calculated during the process are aggregated (e.g., a sum is computed) at 260-13. Otherwise, the process 260 is repeated.

The CHARGING_METHOD 252-7 may define a logic that may be used to determine costs for the event 220 during the rating step 260. One or more of the following kinds of charging may be applicable by the CHARGING METHOD 252-7: tiered, tapered, tiered with history, tapered with history, tiered under, tapered under, tiered threshold, tapered threshold, fixed, and/or pre-charged.

Charges based on the tiered method can be calculated based on a tiered application of the rates defined for the range configured. The tariff can be applied as follows. If a duration of the event 220 exceeds a range, an already configured range cost value for the exceeding range of the event is used. A charge is calculated for the range in which the duration end using the following function:

$$\left[\frac{\text{Min}(\text{Range, Remaining Units})}{\text{Range Increment}}\right] \times$$

$$\frac{\text{Range Rate}}{\text{Range Price Point}} \times \text{Range Increment} = \text{Charge}$$

The charge calculated is summed with a value taken from the configured range cost value exceeded which may be previously discounted (if configured).

Charges based on the tapered method can be calculated based on a tapered application of the rates defined for each range configured. The tariff will be applied as follows. If the duration of the event exceeds a range, a TOTAL_RANGE value for the exceeding range of the event is used. A charge is calculated for the range in which the duration end using the following function:

$$\left[\frac{\text{Units}}{\text{Range Increment}}\right] \times \frac{\text{Range Rate}}{\text{Range Price Point}} \times \text{Range Increment} = \text{Charge}$$

The charge calculated is summed with a value taken from the TOTAL_RANGE which may be previously discounted (if configured).

Charges based on the tiered with history method can be calculated based on a tiered application of the rates defined for the range configured. The tariff will be applied as follows. If the duration of the event exceeds a range, an already configured range cost value for the exceeding range of the event is used. A charge is calculated for the range in which the duration end using the following function:

$$\left[\frac{\text{Min(Range, Remaining Units)}}{\text{Range Increment}}\right] \times \frac{\text{Range Rate}}{\text{Range Price Point}} \times \text{Range Increment} = \text{Charge}$$

The charge calculated is summed with the value taken from the configured range cost value exceeded which may be previously discounted (if configured). Each time the tariff is used, a counter is incremented of the units of the event. The tariff comprises no rule which is based on this counter.

Charges based on the tapered with history method is calculated based on a tapered application of the rates defined for each range configured. The tariff is applied as follows. If the duration of the event exceeds a range, a TOTAL_RANGE value for the exceeding range is used. A charge is calculated for the range in which the duration end using the following function:

$$\left[\frac{\text{Units}}{\text{Range Increment}}\right] \times \frac{\text{Range Rate}}{\text{Range Price Point}} \times \text{Range Increment} = \text{Charge}$$

The charge calculated is summed with a value taken from the TOTAL_RANGE which may be previously discounted (if configured). Each time the tariff is used, a counter is incremented of the units of the event. The tariff comprises no rule which is based on this counter.

Charges based on the tiered under method is calculated based on a tiered application of the rates defined for the range configured. The tariff is applied until a threshold is reached. When the threshold is reached, a corresponding product is not evaluated and is skipped in further charging steps. f an event uses a part being below the threshold, said part is rated by using a tiered rule based on the configured tariff. The tariff will be applied as follows. If the duration of the event exceeds a range, an already configured range cost value for the exceeding range is used. A charge is calculated for the range in which the duration end using the following function:

$$\left[\frac{\text{Min(Range, Remaining Units)}}{\text{Range Increment}}\right] \times \frac{\text{Range Rate}}{\text{Range Price Point}} \times \text{Range Increment} = \text{Charge}$$

The charge calculated is summed with a value taken from the configured range cost value exceeded which may be previously discounted (if configured).

Charges based on the tapered under method are calculated based on a tapered application of the rates defined for each range configured. The tariff is applied until the threshold is reached. When the threshold is reached, a corresponding product is evaluated and is skipped further charging steps. The tariff is applied as follows. If the duration of the event exceeds a range, a TOTAL_RANGE value for the exceeding range of the event is used. A charge is calculated for the range in which the duration end using the following function:

$$\left[\frac{\text{Units}}{\text{Range Increment}}\right] \times \frac{\text{Range Rate}}{\text{Range Price Point}} \times \text{Range Increment} = \text{Charge}$$

The charge calculated is summed with a value taken from the TOTAL_RANGE which may be previously discounted (if configured).

The tiered threshold is applied to a tariff that has different prices, which can be located below and/or above a threshold. An event takes part to the attainment of the threshold. Until the threshold is reached the tariff below the threshold is applied. Above the threshold, another tariff is applied. Charges which lie below or above the threshold are calculated based on a tiered application of the rates defined for the range configured. The tariff is applied if the threshold has been exceeded. If the threshold is not exceeded, a counter is incremented until the threshold is reached. The tariff will be applied as follows. If the duration of the event exceeds a range, a TOTAL_RANGE value for the exceeding range is used. A charge is calculated for the range in which the duration end using the following function:

$$\left[\frac{\text{Min(Range, Remaining Units)}}{\text{Range Increment}}\right] \times \frac{\text{Range Rate}}{\text{Range Price Point}} \times \text{Range Increment} = \text{Charge}$$

The calculated charge is summed with a value taken from the TOTAL_RANGE which may be previously discounted (if configured). This might refer to an internal event cost.

The tapered threshold method is applied to a tariff that has different prices which are located below and/or above a threshold. An event takes part to the attainment of the threshold. Until the threshold is reached a tariff below the threshold is applied. Above the threshold, another tariff is applied. Charges which lie below or above the threshold are calculated based on a tiered application of the rates defined for the range configured. The tariff is applied if the threshold has been exceeded. If the threshold is not exceeded, a counter is incremented. The tariff is applied as follows. If the duration of the event exceeds a range, a TOTAL_RANGE value for the exceeding range of the event is used. A charge is calculated for the range in which the duration end using the following function:

$$\left[\frac{\text{Units}}{\text{Range Increment}}\right] \times \frac{\text{Range Rate}}{\text{Range Price Point}} \times \text{Range Increment} = \text{Charge}$$

The calculated charge is summed with the value taken from TOTAL_RANGE which may be previously discounted (if configured).

Charges based on the fixed method return a flat amount defined in the corresponding charge field of the rate row retrieved. The fixed method is applied to the entire internal event. Charge based on a pre-charged method, corresponding costs is comprised in the event. If configured an extra price and/or a discount can be applied to the costs.

After the event 220 has been rated 260, the event is posted at 280 as shown in FIG. 2. During the posting step 280 a balance associated with the user and a corresponding guiding point balance according to the computed charge rate for the event 220 is determined, and each counter (Utilization Threshold, Utilization Product, etc.) is updated. Hence, after the costs for the event 220 are computed as previously described in accordance with method steps 240 and 260 of the rating method 200 shown in FIG. 2, it is determined how the guiding point and the user corresponding to the guiding point pay the computed costs for the event 220. For this purpose, in addition to the costs computed for the event 220, a utilization for one or more of the products in the product list 262 determined for the event 220, information relating to the one or more services corresponding to the products, and/or information about the event 220 are retrieved.

A utilization product may be a logical counter that can be associated with a product in order to determine for how may units that product can be used. For example, a user comprises an associated rating plan with 100 minutes of free calls per month, after 100 minutes have been consumed, wherein the user may be charged using a standard rate of 10 € per minute. Such an offering may be modeled by a product that is implemented in a utilization product instance table as shown in FIG. 7A and possibly an additional utilization product history table as shown in FIG. 7B.

During the positing step 280, a utilization of the products in the list of products 262 is updated. Based on the information and/or data returned by the rating step 260 regarding the products, for each product, the corresponding UTILIZATION_PRODUCT_INSTANCE_ID is retrieved from a table storing information of the product according to the data model 100 shown in FIG. 1A, and said value is summed to the COUNTER value of the utilized units. When a product has been determined from a list of products associated with the normalized event to be used for rating, it is checked if a utilization product is linked to said product. If this check is true, it is evaluated if there is at least one available unit. If there are still further available units, they are consumed according to event quantity and a corresponding counter in the utilization product history table of the product is updated. If there is no available unit, no computations are performed on the utilization product.

Then the other balance of the balance 122 relating to the guiding point 120 and the corresponding balance 112 of the user 110 as shown in FIG. 1A is updated. The other balance is updated based on the priority used to list the products in the list 262 corresponding to the event 220. The other balance can be for example accessed using a SERVICE_INSTANCE_ID, a GUIDING_POINT_ID and a CUSTOMER_INSTANCE_ID stored in guiding point configuration table 121 of the guiding point 120. Costs for the event 220 computed during the rating step 260 are debited form the other balance on its highest priority level which refers to the accessed and/or requested service itself. In case the other balance has a threshold value, this value is used until this threshold is reached. Therefore, if at least a part of the computed costs cannot be debited because the threshold is reached, a new other balance is retrieved. Said new other balance may be a further one relating to the requested service, or it may be one further relating to the guiding point or the user (following the priority specified in the list of products 262).

If the other balances (related to the service, the guiding point and the user) are considered and the computed costs are still not completely debited, the balance relating to the service is used and updated in accordance with the (remaining part of) the calculated costs for the event 220. In other words, in case costs of an event are determined, the costs are charged on a balance of a user having triggered the event. If the user is associated with at least one further balance, one or more of said further balances might be (additionally and/or alternatively) used to charge the event. A user may be associated with one or more balances, wherein eligible balances are determined according to the service the user uses through an event. Other balances may relate to promotional money basket that can be used by a user. If costs of an event of the user exceed the amount of an other balance, a (standard customer) balance can be updated as well. For example, before having triggered an event, a user may be associated with the following balances: 1, 50 € on his other balance and 10 € on his main (or standard or regular) balance. The user triggers an event with related calculated costs of 2 €. In this case, the other balance is updated and completely used. The main balance is update with the remaining amount of the costs. Consequently, after the event has been performed and charged the user is associated with 1, 50-1, 50=0 € on his other balance and 10-0, 50=9, 50 on his main balance.

Then, the utilization thresholds are updated. The utilization thresholds may be retrieved from the database implementing the data model 100 of FIG. 1A using the SERVICE_INSTANCE_ID, the GUIDING_POINT_INSTANCE_ID and the CUSTOMER_INSTANCE_ID from the corresponding configuration tables in the database (e.g., the service configuration table 131, the user configuration table 111, and the guiding point configuration table 121) and are updated with a value which relates to the units of measure, the thresholds relating to pricing are updated according to the costs calculated for the event 220, and further thresholds are updated with units used to specify the event 220 such as seconds, pulses, byte, etc. Furthermore, in case a threshold of one of the utilization thresholds is reached and/or would be exceeded, an alert may be sent to at least one service addressed by the event 220 and/or the service is deactivated. In other words, when costs for an event 220 are calculated, corresponding threshold counters are updated. Furthermore, it is determined how the corresponding guiding point of the user having triggered the event 220 balances the costs.

According to the method described in FIG. 6, a concept of events being completely or partially charged may be based on using a row of a corresponding product. The eligibility of such a row may be influenced by a threshold that may determine for example free usage, special tariff, etc. Such a tariff is based on a units counter which may maintain a sum of units used by events in order to be able to apply specific rules based on at least one threshold.

For a charge calculated for an event 220, a balance of the corresponding user and/or guiding point according to the used service need to be determined. For this purpose, different kinds of balances (other, pre-paid, post-paid, etc.) may be prioritized as follows: other balance comprises a higher priority than a pre-paid balance defined on a service or on a guiding point and/or than a post-paid balances of a user; pre-paid balance on a service comprises a higher priority than a pre-paid balance on a guiding point and/or than a post-paid balances of a user; and pre-paid balances on a guiding point comprises a higher priority than a post-paid balance of a user.

Figure 8:
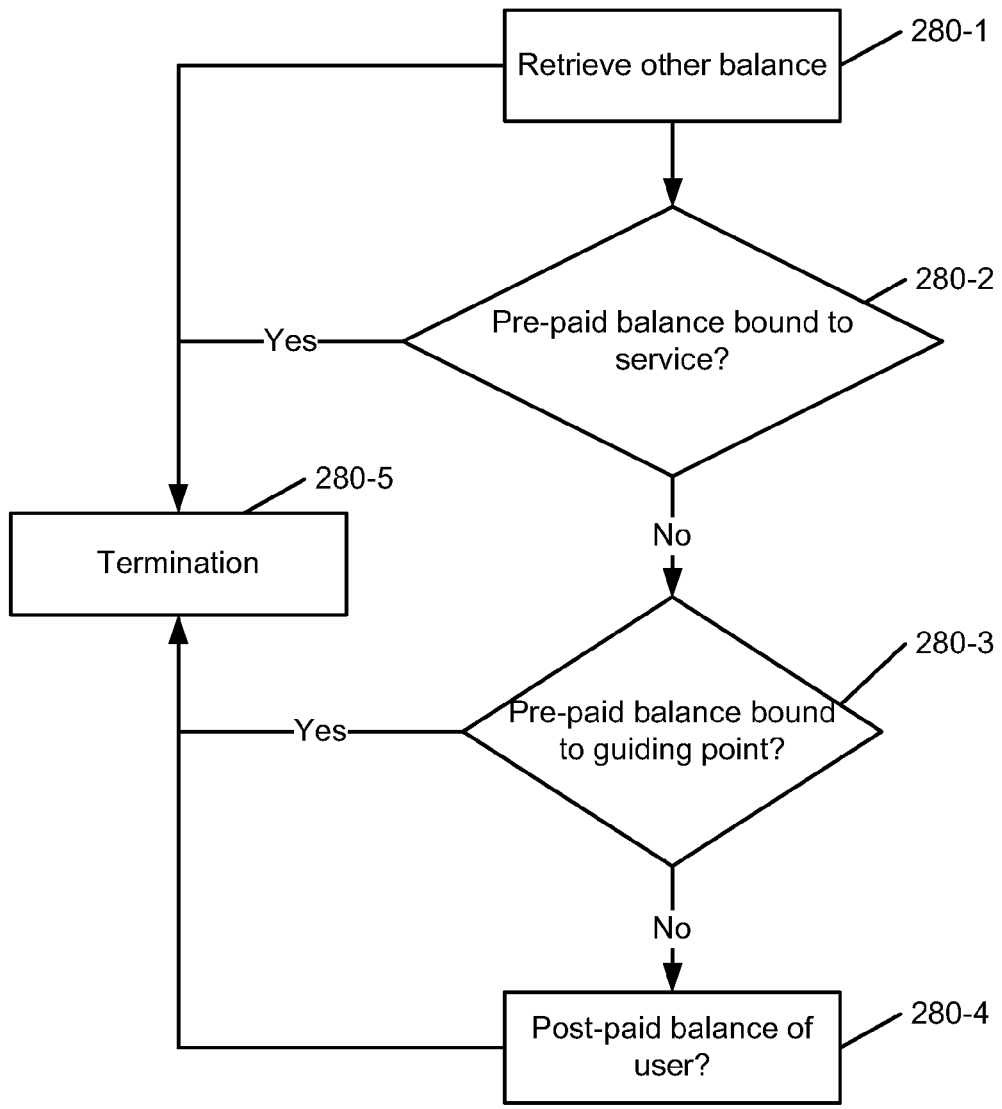
FIG. 8 shows a flow diagram of an exemplary implementation of the posting step in the rating method.

With reference to FIG. 8, an example of the posting step 280 is described in further detail. In particular, FIG. 8 shows how to determine a balance available to pay the previously calculated costs of a event 220. At 280-1, at least one other balance bound to a guiding point corresponding to a user having performed an event 220 may be retrieved and checked whether it is eligible for the event 220. At least three situations are possible: (1) An other balance is retrieved and the remaining credit covers the rated costs of the event 220. (In this case, the other balance is decreased by the amount of the costs and the process ends, 280-5.) (2) An other balance is retrieved wherein the remaining credit covers a part of the rated costs. (In this case, the other balance is decreased to zero and the method proceeds further with step 280-2.) (3) No other balance is retrieved. (In this case, the method proceeds further with step 280-2.) At 280-2, it is checked, whether a pre-paid balance bound to a service corresponding to the event exists. If such a balance exists, the pre-paid balance is decreased by the remaining costs of the event 220 and the method ends, 280-5. Otherwise, the method proceeds further with step 280-3. At 280-3, it is checked, whether a pre-paid balance bound to a guiding point corresponding to the event and a user having performed the event 220 exists. If such a balance exists, the pre-paid balance is decreased by the remaining costs of the event 220 and the method ends, 280-5. Otherwise, the method proceeds further with step 280-4. At 280-4, a post-paid balance bound to user having performed the event 220 is retrieved and decreased by the (remaining) costs and the method ends, 280-5.

Figure 9:
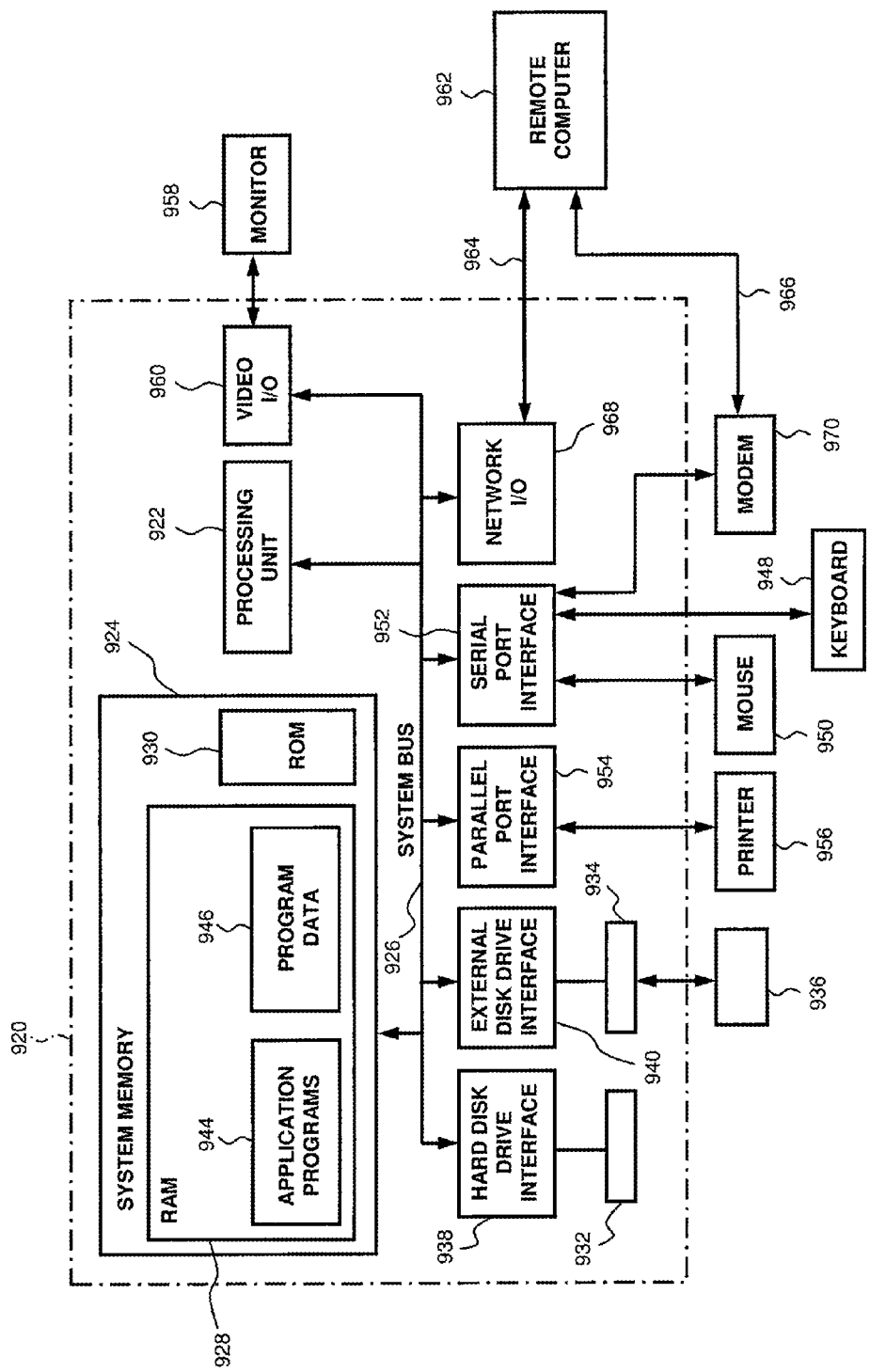
FIG. 9 shows a block diagram of an exemplary computer system and/or computer network.

FIG. 9 shows an exemplary system for implementing the invention, including a general purpose computing device in the form of a conventional computing environment 920 (e.g., a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the method for telecommunications rating, as described above. The relevant data may be organized in a database, for example a relational database management system or an object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 8.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 9 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 9 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other machine, apparatus, or software for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are exemplary and other devices or software for establishing a communications link between the electronic devices may be used.

The above-described computing system is only one example of the type of computing system that may be used to implement the method for telecommunications rating.

We claim:

1. A computer system for telecommunications rating, the system comprising:
   a communication interface configured to receive an event from a source system for a service, wherein the event is generated by a user;
   a memory configured to store: the event, a guiding point associated with the user, at least one balance associated with the user, and a list of products; and
   a processor in communication with the memory and the communication interface, the processor being configured to:
      transform the event into a normalized event by determining event characteristics;
      determine a guiding point identifier to identify the guiding point associated with the user;
      by using the guiding point identifier, retrieve from the guiding point the list of products operable to guide the normalized event;
      rate the normalized event by calculating and aggregating costs according to the list of products; and
      post the costs by updating the at least one balance associated with the user, the guiding point, and/or the service.

2. The computer system of claim 1, wherein the processor is further configured to perform the transformation by mapping the event based on where-based, who-based, what-based and when-based event characteristics according to a configuration table for the event to the normalized event.

3. The computer system of claim 2, wherein the processor is further configured to use the configuration table as a mapping function and output to the memory an internal configuration table for the normalized event.

4. The computer system of claim 1, wherein the processor is further configured to generate the list of products by following a priority logic, wherein a first element in the list of products is associated with the service, a second element in the list of products is associated with the guiding point, and a last element in the list of products is associated with the user.

5. The computer system of claim 1, wherein the processor is further configured to rate the normalized event by checking for a product in the list of products and determining whether the product is associated with a threshold.

6. The computer system of claim 1, wherein the processor is further configured to post the costs for the event by updating a utilization threshold of a product in the list of products.

7. The computer system of claim 1, wherein the processor is further configured to rate the normalized event by applying a charging method to a product in the list of products, wherein the charging method comprises a logic stored in the memory for determining the costs for the event.

8. A computer program product comprising computer readable instructions, which when loaded and run in a computer system, causes the computer system to:
   receive, through a communication interface, an event from a source system for a service, wherein the event is generated by a user;
   store in a memory: the event, a guiding point associated with the user, at least one balance associated with the user, and a list of products;
   transform, using a processor in communication with the memory and the communication interface, the event into a normalized event by determining event characteristics,
   determine a guiding point identifier to identify the guiding point associated with the user;
   by using the guiding point identifier, retrieve from the guiding point the list of products operable to guide the normalized event;
   rate the normalized event by calculating and aggregating costs according to the list of products; and
   post the costs by updating the at least one balance associated with the user, the guiding point, and/or the service.

9. The computer program product of claim 8, wherein the transformation is performed by the computer system by mapping the event based on where-based, who-based, what-based and when-based event characteristics according to a configuration table for the event to the normalized event.

10. The computer program product of claim 9, wherein the configuration table is used by the computer system as a mapping function having as output to the memory an internal configuration table for the normalized event.

11. The computer program product of claim 8, wherein the list of products is generated by the computer system by following a priority logic stored in the memory, wherein a first element in the list of products is associated with the service, a second element in the list of products is associated with the guiding point, and a last element in the list of products is associated with the user.

12. The computer program product of claim 8, wherein the computer readable instructions further causes the computer system to rate the normalized event by checking for a product in the list of products and determining whether the product is associated with a threshold.

13. The computer program product of claim 8, wherein the computer readable instructions further causes the computer system to post the costs for the event further comprises updating a utilization threshold of a product in the list of products.

14. The computer program product of claim 8, wherein the computer readable instructions further causes the computer system to rate the normalized event by applying a charging method to a product in the list of products, wherein the charging method comprises a logic for determining the costs for the event.

15. A computer-implemented method for telecommunications rating, the method comprising:
   receiving, by a communication interface, an event from a source system for a service, wherein the event is generated by a user;
   storing in a memory: the event, a guiding point associated with the user, at least one balance associated with the user, and a list of products;
   transforming, by a processor in communication with the memory and the communication interface, the event into a normalized event by determining event characteristics,
   determining, by the processor, a guiding point identifier to identify the guiding point associated with the user;
   by using the guiding point identifier, retrieving from the guiding point the list of products operable to guide the normalized event;
   rating, by the processor, the normalized event by calculating and aggregating costs according to the list of products; and
   posting, by the processor, the costs by updating the at least one balance associated with the user, the guiding point, and/or the service.

16. The computer-implemented method of claim 15, wherein the transformation is performed by the processor by mapping the event based on where-based, who-based, what-based and when-based event characteristics according to a configuration table for the event to the normalized event.

17. The computer-implemented method of claim 16, wherein the configuration table is used by the processor as a mapping function having as output to the memory an internal configuration table for the normalized event.

18. The computer-implemented method of claim 15, wherein the list of products is generated by the processor by following a priority logic stored in the memory, wherein a first element in the list of products is associated with the service, a second element in the list of products is associated with the guiding point, and a last element in the list of products is associated with the user.

19. The computer-implemented method of claim 15, wherein rating the normalized event further comprises checking for a product in the list of products and determining by the processor whether the product is associated with a threshold.

20. The computer-implemented method of claim 15, wherein posting the costs for the event further comprises updating, by the processor, a utilization threshold of a product in the list of products.

21. The computer-implemented method of claim 15, wherein rating the normalized event further comprises applying, by the processor, a charging method to a product in the list of products, wherein the charging method comprises a logic stored in the memory for determining the costs for the event.

\* \* \* \* \*